(12) United States Patent
Suzuki et al.

(10) Patent No.: US 8,098,388 B2
(45) Date of Patent: Jan. 17, 2012

(54) CONTENT TRANSMISSION DEVICE, CONTENT TRANSMISSION METHOD, AND COMPUTER PROGRAM USED THEREWITH

(75) Inventors: Hiroyuki Suzuki, Kanagawa (JP); Takehiko Nakano, Kanagawa (JP); Hisato Shima, Tokyo (JP)

(73) Assignee: Sony Corporation, Tokyo (JP)

( * ) Notice: Subject to any disclaimer, the term of this patent is extended or adjusted under 35 U.S.C. 154(b) by 1002 days.

(21) Appl. No.: 11/530,332

(22) Filed: Sep. 8, 2006

(65) Prior Publication Data

US 2007/0091359 A1    Apr. 26, 2007

(30) Foreign Application Priority Data

Oct. 4, 2005    (JP) ................................ 2005-290753

(51) Int. Cl.
*G06F 3/12* (2006.01)
(52) U.S. Cl. .................. 358/1.15; 340/3.1; 713/193
(58) Field of Classification Search .......... 358/1.1–3.23; 340/3.1; 713/193
See application file for complete search history.

(56) References Cited

U.S. PATENT DOCUMENTS

| 2004/0174874 | A1* | 9/2004 | Saito et al. | 370/389 |
|---|---|---|---|---|
| 2005/0193194 | A1* | 9/2005 | Kokubo | 713/160 |
| 2007/0091359 | A1* | 4/2007 | Suzuki et al. | 358/1.15 |
| 2008/0263372 | A1* | 10/2008 | Sako et al. | 713/193 |

FOREIGN PATENT DOCUMENTS

| JP | 10-302391 | 11/1998 |
|---|---|---|
| JP | 11-86437 | 3/1999 |
| JP | 2000-40294 | 2/2000 |
| JP | 2000-40298 | 2/2000 |
| JP | 2000-295240 | 10/2000 |
| JP | 2002-83465 | 3/2002 |
| WO | WO 2005/057865 A1 | 6/2005 |

OTHER PUBLICATIONS

"Digital Transmission Content Protection Specification", vol. 1(Informational Version), Revision 1.4, Feb. 28, 2005, pp. 1-81.
"DTCP vol. 1 Supplement E Mapping DTCP to IP", (Informational Version), Revision 1.1, Feb. 28, 2005, pp. 1-32.

* cited by examiner

*Primary Examiner* — Benny Tieu
*Assistant Examiner* — Marcellus Augustin
(74) *Attorney, Agent, or Firm* — Oblon, Spivak, McClelland, Maier & Neustadt, L.L.P.

(57) ABSTRACT

A content transmission device for transmitting content, whose copying is controlled, includes an authentication section for performing an authentication procedure between the content transmission device and a content receiving device, a first copy-control-information processing section for processing first copy control information describing copy control information concerning the content, a second copy-control-information processing section for processing second copy control information including content information different from the first copy control information, and a content transmission section for generating and transmitting, to the content receiving device, a packet including a header including the first copy control information and the second copy control information, and a payload obtained by encrypting the content with a predetermined content key.

21 Claims, 31 Drawing Sheets

CONTENT TRANSMISSION DEVICE, CONTENT TRANSMISSION METHOD, AND COMPUTER PROGRAM USED THEREWITH

CROSS REFERENCES TO RELATED APPLICATIONS

The present invention contains subject matter related to Japanese Patent Application JP 2005-290753 filed in the Japanese Patent Office on Oct. 4, 2005, the entire contents of which are incorporated herein by reference.

BACKGROUND OF THE INVENTION

1. Field of the Invention

The present invention relates to content transmission devices and content transmission methods for transmitting content, which is encrypted for copyright protection or other purposes, and computer programs used therewith. In particular, the present invention relates to a content transmission device and method for use in executing an encrypted content transmission procedure between DTCP (Digital Transmission Content Protection) compliant devices, and to a computer program used therewith.

More specifically, the present invention relates to a content transmission device and method for transmitting content in a form in which attribute information and copy control information concerning the content are inserted in each packet, and a computer program used therewith. In particular, the present invention relates to a content transmission device and method for transmitting content in a form in which attribute information and copy control information concerning the content are inserted into each packet in a form that is not dependent on the format of the content, and a computer program used therewith.

2. Description of the Related Art

With widespread use of information technology, most audio-visual (AV) content has become digitized, and digital content recording/playback media, such as compact discs (CDs) and digital versatile discs (DVDs), have become widely used. Also, recently, devices for digitally recording content, such as hard disk drive (HDD) recorders and DVD recorders, have started to be used even in homes. In addition, distribution and delivery services of content such as video and audio via networks have become popular. Accordingly, content is delivered between remote terminals via a network without transfer of a medium such as a CD or a DVD.

obviously, in the case of Japan, in Japanese Copyright Law, AV content can be protected as a copyrighted work from unauthorized use such as unauthorized duplication and alteration. In Japanese Copyright Law, under Article 30, it is permissible for a user to reproduce a work forming the subject matter of copyright for the purpose of personal use, family use or other similar uses within a limited circle, while, under Article 49(1), it is prohibited to use a reproduction except for private use.

However, for digitized content, unauthorized manipulations, such as copying and alteration, can be easily performed. Accordingly, not only from a viewpoint of development of laws but also from a technical viewpoint, protection against unauthorized use is necessary while permitting personal or family use of content. In particular, in Japan, with the approaching cessation of analog terrestrial television broadcasting in 2011, replacement of digital terrestrial television receivers for analog broadcast television receivers is rapidly proceeding. Accordingly, for digitalization of AV content in homes, it is very necessary to technically realize content protection.

Many technologies intended to protect copyright of digital content have been developed. For example, industry standards concerning protection of digital transmission content include the Digital Transmission Content Protection (DTCP) developed by the Digital Transmission Licensing Administrator (DTLA). DTCP prescribes a mechanism for content transmission in a copyright-protected form (see, for example, Digital Transmission Content Protection Specification Volume 1 (Informational Version), Revision 1.4) (http://www.dtcp.com/).

DTCP includes provisions concerning an authentication protocol in content transmission between devices and a transmission protocol for encrypted content. In brief, a DTCP compliant device may not send, to the exterior, in an uncompressed state, easy-to-manipulate compressed content complying with a standard such as MPEG (Moving Picture Experts Group). Key exchange necessary for decrypting encrypted content is performed in accordance with a predetermined mutual authentication and key exchange algorithm, that is, the Authentication and Key Exchange (AKE) algorithm. In addition, the range of devices which use AKE commands to exchange keys is restricted.

A server (DTCP_Source) that is a content provider and a client (DTCP_Sink) that is a content receiver share a key after performing an authentication procedure by transmitting and receiving AKE commands, and use the key to encrypt a transmission path before performing content transmission. Accordingly, it is difficult for a client to acquire an encryption key unless the client and the server succeed in mutual authentication with each other. Thus, it is difficult for an unauthorized client to enjoy content. Moreover, by limiting the number and range of devices that can transmit and receive AKE commands, use of the content can be limited to personal or family use according to Japanese Copyright Law.

DTCP primarily makes prescriptions concerning transmission of digital content on a home network in which an IEEE (Institute of Electrical and Electronics Engineers) 1394 bus is used as a transmission path. However, recently, as is typified by the Digital Living Network Alliance (DLNA), there has been an increasing trend toward distributing digitized AV content in a home by using an Internet Protocol (IP) network. Accordingly, development of DTCP technology for IP networks, that is, DTCP mapping to IP (DTCP over Internet Protocol), is in progress. Regarding many home networks, it is pointed out that unauthorized copying and alteration of content may occur when the home networks are connected to external IP networks such as the Internet via routers. It is an urgent need that, by establishing DTCP-IP technology, flexible and efficient use of the digital content is achieved by using an IP network while protecting digital content.

Basically, DTCP-IP is included in DTCP standards and is similar to DTCP technology, and is a technology in which DTCP technology is implanted in the IP network. However, DTCP-IP differs from the original DTCP prescribed on the IEEE 1394 basis in that DTCP-IP uses an IP network and that DTCP-IP uses protocols such as the Hyper Text Transfer Protocol (HTTP) and the Real Time Protocol (RTP). In addition, in DTCP-IP, various types of devices, mainly such as personal computers, are connected to the IP network, so that there is a high possibility that data may be easily sniffed and altered. Accordingly, DTCP-IP prescribes a further method for transmitting content through a network while protecting the content (see, for example, DTCP Volume 1 supplement E Mapping DTCP to IP (Informational Version), Revision 1.1 (http://www.dtcp.com/).

Content transmission complying with DTCP-IP is described below. When content transmission is performed by using the HTTP protocol between source and sink devices complying with DTCP-IP, encrypted communication is performed while changing a content key in the middle of transmission of a very long byte stream such as a Transmission Control Protocol (TCP) stream, and a content key confirmation procedure is performed when an encrypted content decrypting process and another content process are implemented. In addition, a TCP connection is established for each of procedures of mutual authentication and key exchange (AKE), content transmission, and content key confirmation.

Specifically, when an AKE procedure is successfully performed, the DTCP_Source device and the DTCP_Sink device can share authentication key $K_{auth}$. The DTCP_Source device generates seed key $K_x$, which serves as a content key seed, uses authentication key $K_{auth}$ to encrypt the generated key, and sends the encrypted key to the DTCP_Sink device. After using a random number to generate nonce $N_c$, the DTCP_Source device generates content key $K_c$ on the basis of seed key $K_x$, nonce $N_c$, and an extended encryption mode indicator (E-EMI) representing an encryption mode. After using content key $K_c$ to encrypt content requested by the DTCP_Sink device, the DTCP_Source device transmits, to the sink device, on a TCP stream, packets in each of which a header includes the encrypted content, nonce $N_c$, and the E-EMI. By extracting nonce $N_c$ and the E-EMI from the TCP stream, the DTCP_Sink device can use the extracted items and key $K_x$ to similarly calculate content key $K_c$, and can decrypt the encrypted content.

In such a manner, in DTCP-IP, by performing authentication between DTCP compliant devices, sharing a key between the devices which have successfully completed DTCP authentication, and performing encryption and decryption when content is transmitted, a content transmission technique which is also secure on an IP network and which prevents content from being sniffed and altered in the middle of a transmission path can be provided.

For example, when content is requested in accordance with an HTTP procedure, the DTCP_Source and DTCP_Sink devices respectively serve as an HTTP server and as an HTTP client to create a TCP/IP connection for HTTP, and initiate content transmission. The HTTP client requests content on an HTTP server in an operating process which is identical to that of normal HTTP. In response thereto, the HTTP server sends back the requested content as an HTTP response. The DTCP_Source uses content key $K_c$ to encrypt the content requested by the DTCP_Sink, and transmits, on a TCP stream, packets which each include a header including a payload formed by the encrypted content, nonce $N_c$, and an E-EMI.

In addition, when the same encryption key is continuously used for the entirety of a very long stream, a possibility that the key may be decrypted increases. Accordingly, the DTCP_Source device updates content key $K_c$ by incrementing nonce $N_c$ by one in units of 128-MB content. Since, in the middle of a byte stream, nonce $N_c$ is greatly changed, a content key confirmation procedure is necessary, and, for the DTCP_Source device, the DTCP_Sink device performs a procedure for confirming nonce $N_c$.

In addition, in a content transmission system for supporting copyright protection, it is necessary to specify a content attribute concerning content protection. In DTCP-IP, by using two mechanisms, that is, an E-EMI and Embedded CCI which are described in a protected content packet (PCP) header, transmission of copy control information associated with content can be realized.

Embedded CCI is copy control information that is transmitted as part (i.e., in a form embedded in a PCP payload) of a content stream to be encrypted. Although many content formats include fields allocated for CCI in a form associated with a stream, a CCI definition and format are unique for each content format. Embedded CCI is interpreted as having a meaning such as "Copy Never", "Copy One Generation", "No More Copies", or "Copy Free". Since tampering of a content stream is implementation of false decryption, the integrity of embedded CCI can be guaranteed.

E-EMI enables easy access and realizes security by representing copy control information concerning the content stream in the PCP header. By locating an E-EMI in an easily accessible location of a particular bit position of a PCP header in a plaintext state, the device can immediately identify the copy control information of the content stream, whereby it is not necessary to extract embedded CCI by decrypting the content transmission format. E-EMI is important to enable the realization of a bit-stream-storage device that is unable to recognize and decode a special content format such as that of digital VCR.

A proper source device complying with DTCP-IP selects a correct encryption mode in accordance with the characteristics of a content stream, and sets an E-EMI on the basis of the selected encryption mode. Also, a proper sink device selects a correct encryption mode which is specified by an E-EMI in a PCP header. Since the E-EMI is used for generating content key $K_c$, tampering of the E-EMI causes mismatch between content keys $K_c$ in encryption and decryption modes. Thus, content decryption fails, thus maintaining security.

FIG. 31 illustrates an internal structure of a PCP header (see, for example, DTCP Volume 1 Supplement E Mapping DTCP to IP (Informational Version), Revision 1.1, V1SE.4.22 Modification to 6.3.3 Content Encryption Formats). In this structure, an E-EMI is a 4-bit field describing an encryption mode. Values of the E-EMI correspond to types of copy control information. The definitions of bit values are shown in the following table (see, for example, DTCP Volume 1 Supplement E Mapping DTCP to IP (Informational Version), Revision 1.1, V1SE.4.7 Modifications to 6.4.2 Encryption Mode Indicator (EMI)). In the table, nine E-EMI values unused are reserved for future extension.

TABLE 1

| E-EMI Value | Encryption Mode | Copy Control Information |
|---|---|---|
| 1100 | A0 | Copy never (CN) |
| 1010 | B1 | Copy-one-generation (COG) [Format-cognizant recording only] |
| 1000 | B0 | Copy-one-generation (COG) [Format-non-cognizant recording permitted] |
| 0110 | C1 | Move mode (Audiovisual) |
| 0100 | C0 | No-more-copies (NMC) |
| 0010 | D0 | Copy-free with EPN asserted (CF/EPN) |
| 0000 | N.A. | Copy-free (CF) |

As described above, the PCP header includes an E-EMI specifying the encryption mode and copy control information of content. These parameters are insufficient as copy control information for the purpose of content protection. That is, necessary copy control information may not be written in the 4-bit E-EMI field. For example, pieces of output control information, such as a parameter (Analog Protection System (APS)) concerning analog output control of content and a parameter (Image Constraint Token (ICT)) concerning a picture size in an output mode, are treated as elements of copy control information in DTCP. In this specification, the output control information is additional or extended copy control information and is also called "super-extended copy control information". The pieces of copy control information are not written in the E-EMI. Thus, it is only possible to embed the pieces of copy control information as part of Embedded CCI.

Also, as one of copy control functions in DTCP, the "Cognizant Function" in which, instead of controlling copying simply in accordance with an E-EMI, when a device correctly recognizes the format of content and Embedded CCI (that is, in a "cognizant" case), a content processing method is controlled in accordance with the Embedded CCI is provided. By using the cognizant function, it is necessary to compare the E-EMI extracted from the PCP header and the Embedded CCI extracted from the PCP payload. Relationship between the Embedded CCI and the EMI are shown in the following table.

TABLE 2

| | Embedded-CCI | | | | | |
|---|---|---|---|---|---|---|
| E-EMI | CF | CF/EPN | NMC | COG-AV | COG-Audio | CN |
| A0 | Allowed | Allowed | Allowed | Allowed | Allowed | Allowed |
| B1 | Allowed | Allowed | Prohibited | Alowed | Allowed | Prohibited |
| B0 | Allowed | Allowed | Prohibited | Allowed | Prohibited | Prohibited |
| C1 | Prohibited | Prohibited | Allowed | Prohibited | Prohibited | Prohibited |
| C0 | Allowed | Allowed | Allowed | Allowed | Allowed | Prohibited |
| D0 | Allowed | Allowed | Prohibited | Prohibited | Prohibited | Prohibited |
| N.A. | Allowed | Prohibited | Prohibited | Prohibited | Prohibited | Prohibited |

However, DTCP-IP only prescribes that Embedded CCI is transmitted as part of a content stream. In the current DTCP-IP, there is no provision concerning an Embedded CCI configuration method other than a provision (see, for example, Digital Transmission Content Protection Specification Volume 1 (Informational Version), Revision 1.4, Appendix B DTCP_Descriptor for MPEG Transport Streams) in which a DTCP descriptor corresponding to Embedded CCI is inserted concerning MPEG transport streams. Although fields for transmitting an CCI in a form associated with a stream are allocated in many content formats including an MPEG format, it is actual that the definition and format of CCI are unique or differs for each content format.

Embedding of copy-control information in a PCP payload is insertion of copy-control information in content. Thus, inevitably, the description method of the copy control information is dependent on a content format and differs for each format. Therefore, when AV content is transmitted in encrypted form complying with DTCP-IP, it is necessary for the DTCP_Source device to perform transmission while changing copy control information for each format, and it is necessary for the DTCP_Sink device to prepare software or hardware for analyzing copy control information for each format. This results in an increase in device costs. In addition, when copy control information is embedded in an encrypted PCP payload, a problem occurs in that, at a receiving end, the copy control information is not extracted unless it is decrypted.

SUMMARY OF THE INVENTION

According to an embodiment of the present invention, it is desirable to provide a content transmission device and content transmission method for use in suitably executing an encrypted content transmission procedure between information devices complying with DTCP, and a computer program used therewith.

According to another embodiment of the present invention, it is desirable to provide a content transmission device and content transmission method for suitably transmitting, in a form inserted in packets, attribute information and copy control information of content to be transmitted, and a computer program used therewith.

According to another embodiment of the present invention, it is desirable to provide a content transmission device and content transmission method for inserting attribute information and copy control information of content in a common form that is not dependent on the format of the content and securely using the attribute information and the copy control information, and a computer program used therewith.

According to an embodiment of the present invention, there is provided a content transmission device for transmitting content, whose copying is controlled, the content transmission device including authentication means for performing an authentication procedure between the content transmission device and a content receiving device, first copy-control-information processing means for processing first copy control information describing copy control information concerning the content, second copy-control-information processing means for processing second copy control information including content information different from the first copy control information, and content transmission means for generating and transmitting a packet to the content receiving device, the packet including a header including the first copy control information and the second copy control information, and a payload obtained by encrypting the content with a predetermined content key.

Preferably, the first copy control information processed by the first copy-control-information processing means includes copy control information prescribing whether or not content copying is allowed, and information of an encryption mode responding to whether or not the content copying is allowed.

The second copy control information processed by the second copy-control-information processing means may include information concerning output control of the content.

The content transmission device may operate under a transmission-system environment in which content transmission is performed by using a packet having a format including a header including a field in which the first copy control information is written and a payload including content in which content-embedded copy control information is embedded. The second copy control information processed by the second copy-control-information processing means may include mode information representing validity of the second copy control information included in the header, and substitution information representing substitutability of content-embedded copy control information concerning the first copy control information.

Under the transmission-system environment, a cognizant function for implementing copy control of the content in response to recognizability of a format of the content may be provided, and the second copy-control-information processing means may realize the cognizant function depending on a combination of the mode information included as the second copy control information in the header and the content-embedded copy control information in the payload.

Under the transmission-system environment, the content may be encrypted by using a content key generated by using a nonce, and the header includes a field for transmitting a nonce having a predetermined bit length, and the content transmission means may transmit the packet in a form in which the second copy control information is embedded in the field for transmitting the nonce.

The content transmission device may further include pseudo nonce generating means for generating a pseudo nonce which is shorter than the predetermined bit length by the number of bits of the second copy control information. The content transmission means may encrypt the content by using a content key generated by a nonce formed by a bit concatenation of the second copy control information and the pseudo nonce.

The content transmission device may further include content key confirmation means for verifying the nonce included in the header of the packet in response to a request from the content receiving device. When the packet is transmitted in a form in which the header includes a nonce in which the second copy control information is embedded, in response to a request from the content receiving device for verifying a nonce, the content key confirmation means may verify the verification-requested nonce by comparing the verification-requested nonce with the nonce in which the second copy control information is embedded.

When the content transmission device performs transmission of the packet with the header including the first copy control information and the second copy control information, the authentication means may describe information representing the transmission in an authentication command to be transmitted to the content receiving device.

According to another embodiment of the present invention, there is provided a computer program described in a computer-readable form so that processing for transmitting content, whose copying is controlled, is executed by a computer system, the computer program allowing the computer system to execute the steps of performing an authentication procedure between a content transmitting device and a content receiving device, setting second copy control information including content information different from the first copy control information, and generating and transmitting a packet to the content receiving device, the packet including a header including the first copy control information and the second copy control information, and a payload obtained by encrypting the content with a predetermined content key.

The above computer program is the definition of a computer program that is described in a computer-readable form so that predetermined processing can be realized by a computer system. In other words, by installing the above computer program into a computer system, an operative operation is performed by the computer system, whereby an operation and advantages similar to those of the above content transmission device can be obtained.

According to an embodiment of the present invention, a content transmission device and content transmission method for use in suitably executing an encrypted content transmission procedure between information devices complying with DTCP, and a computer program used therewith can be provided.

According to another embodiment of the present invention, a content transmission device and content transmission method for suitably transmitting, in a form inserted in packets, attribute information and copy control information of content to be transmitted, and a computer program used therewith can be provided.

According to another embodiment of the present invention, a content transmission device and content transmission method for inserting attribute information and copy control information of content in a common form that is not dependent on the format of the content and securely using the attribute information and the copy control information, and a computer program used therewith can be provided.

According to an embodiment of the present invention, when encrypted content complying with DTCP-IP is transmitted, all copy control information necessary for a sink device can be described in a protected content packet header. In other words, copy control information can be transmitted in a form added to content without (i.e., in a form common to all formats) being dependent on the format of the content. The source device creates copy control information and, in the sink device, software or hardware modules for analyzing copy control information are set to be common to all formats, whereby device costs can be reduced.

In addition, by describing all necessary copy control information in a protected content packet header, copy control information transmission can be performed without being dependent on the format of content. Thus, an embodiment of the present invention is similarly applicable to an MPEG transport stream already prescribed in DTCP-IP.

Further features and advantages of the present invention will become apparent from a more detailed description based on embodiments of the present invention and the accompanying drawings.

DESCRIPTION OF THE PREFERRED EMBODIMENTS

The present invention is directed to information communication systems for receiving and decrypting encrypted data as a byte stream on a network such as a TCP/IP (Transmission Control Protocol/Internet Protocol) or from a file system. In particular, the present invention is directed to an information communication system for communicating a very long byte stream such as a TCP stream, while changing a decryption key in the communication process. A specific example of such a system is HTTP-protocol content transmission performed between DTCP devices. Embodiments of the present invention are described below with reference to the accompanying drawings.

A. System Configuration

Figure 1:
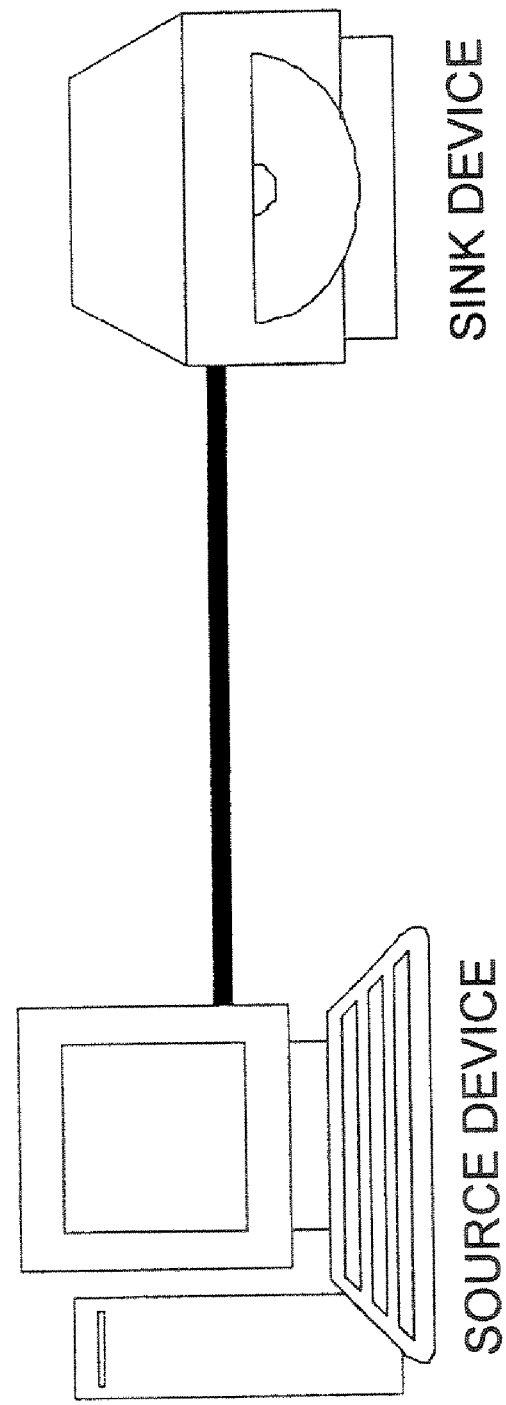
FIG. 1 is a schematic illustration of an example of the configuration of an information communication system according to an embodiment of the present invention.

Content transmission complying with DTCP-IP uses a source device serving as a server for receiving a content request and transmitting content, and a sink device serving as a client for requesting content, receiving the content, and playing back or recording the received content. FIG. 1 shows a schematic example of the configuration of an information communication system according to an embodiment of the present invention.

In the example shown in FIG. 1, entities as the source device and the sink device form a DTCP-IP AKE system.

The source device is an authentication server conforming to DTCP-IP, and the sink device is an authentication client conforming to DTCP-IP. Both are connected to each other by a network.

The types of the network include Ethernet, the Internet, and other IP networks.

Figure 2:
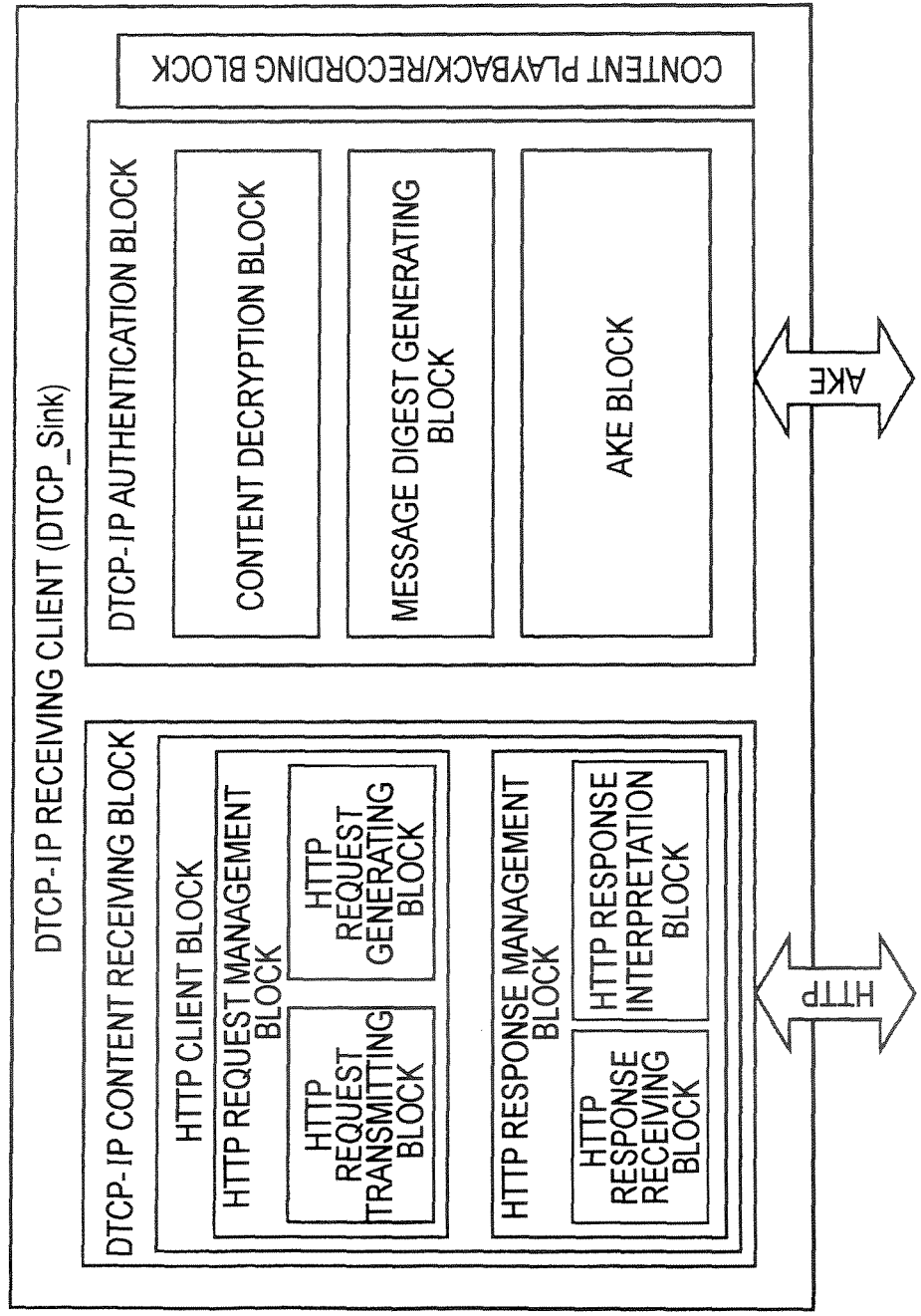
FIG. 2 is a block diagram showing a functional configuration of an information communication device that operates as a client (i.e., a sink device) in the information communication system shown in FIG. 1.
Figure 3:
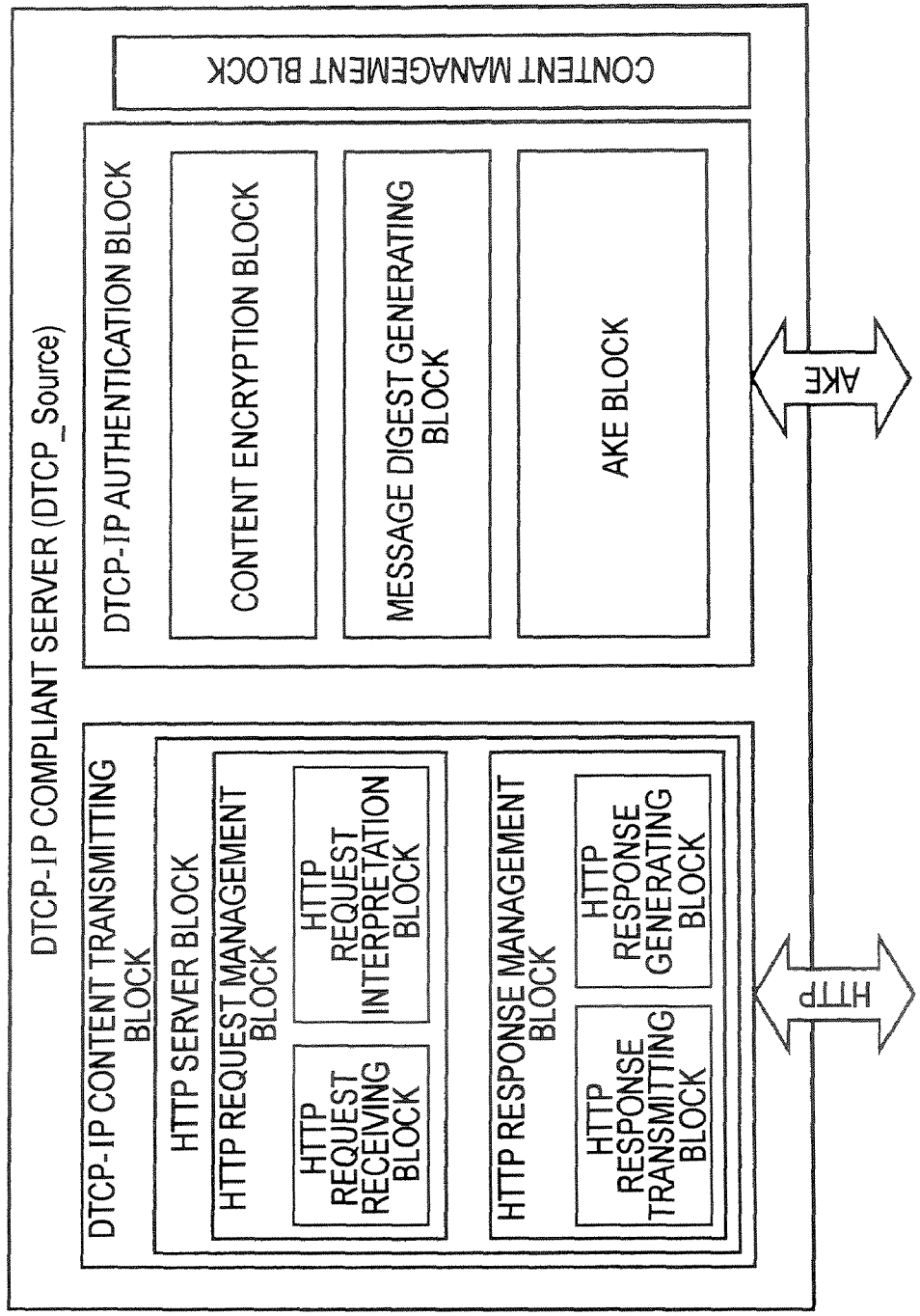
FIG. 3 is a block diagram showing a functional configuration of an information communication device that operates as a server (i.e., a source device) in the information communication system shown in FIG. 1.

FIGS. 2 and 3 show schematic functional configurations, concerning authentication and content transmission, of content transmitting devices that operate as the client (i.e., the sink device) and the server (i.e., the source device) in the information communication system shown in FIG. 1. The sink and source devices can establish connection on a TCP/IP network such as the Internet and can execute an authentication procedure and a content transmission procedure by using the connection.

The sink device shown in FIG. 2 complies with the DTCP-IP and operates as a DTCP_Sink. The client device shown in FIG. 2 has, as functional blocks, a DTCP-IP authentication block, a DTCP-IP content receiving block, and a content playback/recording block.

The DTCP-IP authentication block includes an AKE block, a message digest generating block, and a content decryption block.

The AKE block realizes an AKE mechanism (on a DTCP_Sink side) in DTCP-IP. The AKE block also has a function of transferring a parameter which is requested by the message digest generating block, which is described later.

The message digest generating block generates a message digest of a parameter in accordance with a specified algorithm. As an algorithm for generating the message digest, a prepared algorithm can be specified. Types of the prepared algorithm include, for example, one-way hash function algorithms, such as MD5 and SHA-1. Although SHA-1 corresponds to improved MD4 similarly to MD5, its encryption strength exceeds that of an MD series since it generates a 160-bit hash value.

The message digest generating block is located closely to the AKE block so as to generate a message digest of a parameter retained by the AKE block, which is not allowed to be open outside the DTCP-IP authentication block. The message digest generating block can request a parameter from the AKE block and can acquire the parameter. The message digest generating block can create a message digest of the parameter or an externally given parameter.

The content decryption block calculates a decryption key $K_c$ by using a key $K_x$ exchanged in AKE, and uses the decryption key $K_c$ to decrypt encrypted content data received from a server. The decrypted content is transferred to the content playback/recording block.

The content playback/recording block plays back the transferred content in a playback mode, and stores the transferred content in a recording mode. However, a content recording operation complies with copy control information inserted in a packet PCP for content transmission.

The DTCP-IP content receiving block is a processing module for executing a content transmission procedure with the source device after performing AKE. In the example shown in FIG. 2, the DTCP-IP content receiving block includes an HTTP client block. The DTCP-IP content receiving block serves as an HTTP client to request content from an HTTP server and receives the content as a response from the HTTP server.

The HTTP client block is divided into an HTTP request management block and an HTTP response management block. The HTTP request management block is further divided into an HTTP request transmitting block and an HTTP request generating block.

The HTTP request generating block generates a content transmission request (HTTP request) to be transmitted. The generated HTTP request is transmitted to the server by the HTTP request transmitting block.

The HTTP response management block is divided into an HTTP response receiving block and an HTTP response interpretation block. An HTTP response and the encrypted content sent as a response from the server are received by the HTTP response receiving block. The received HTTP response is checked by the HTTP response interpretation block. If the result of the check by the HTTP response interpretation block is affirmative, the received encrypted content is sent to a content decryption block in a DTCP authentication block. In addition, if the result of the check by the HTTP response interpretation block is negative, processing for an error response is performed. The HTTP response from the source device includes at least one PCP.

Each of the DTCP-IP authentication block and the DTCP-IP content receiving block establishes a separate TCP/IP connection to the server device, and independently executes an authentication procedure and a content transmission procedure.

The source device shown in FIG. 3 complies with DTCP-IP and operates as a DTCP_Source. The source device has, as functional blocks, a DTCP-IP authentication block, a DTCP-IP content transmitting block, and a content management block.

The DTCP-IP authentication lock corresponds to authentication procedure executing means, and includes an AKE block, a message digest generating block, and a content encryption block.

The AKE block realizes an AKE mechanism (on a DTCP_Source side) in DTCP-IP. The AKE block also has a function of transferring a parameter which is requested by the message digest generating block, which is described later. The AKE block stores pieces of DTCP_Sink-device information for authenticated devices and, when content is requested by a client, uses the pieces of the information to determine whether or not the client is already authenticated.

The message digest generating block generates a message digest of a parameter in accordance with a specified algorithm. As an algorithm for generating the message digest, a prepared algorithm can be specified. Types of the prepared algorithm include, for example, one-way hash function algorithms, such as MD5 and SHA-1, as described above.

The message digest generating block is located closely to the AKE block so as to generate a message digest of a parameter retained by the AKE block, which is not allowed to be open outside the DTCP-IP authentication block. The message digest generating block can request a parameter from the AKE block and can acquire the parameter. The message digest generating block can create a message digest of the parameter or an externally given parameter.

The content encryption block encrypts content data read from the content management block in response to a request of the DTCP-IP content transmitting block by using a content key $K_c$ generated from a key $K_x$ exchanged in AKE. The decrypted content is transferred to the DTCP-IP content transmitting block in order to transmit the decrypted content to the client.

The content management block uses the DTCP-IP mechanism to manage content to be protected. The content management block transfers content data in response to reading by the content encryption block.

The DTCP-IP content transmitting block includes an HTTP server block. The DTCP-IP content transmitting block serves as a HTTP server to receive a request from a client and executes processing in response to the request.

The HTTP server block is divided into an HTTP request management block and an HTTP response management block. The HTTP request management block is further divided into an HTTP request receiving block and an HTTP request interpretation block.

The HTTP request receiving block receives an HTTP request from the client. The received HTTP request is sent and checked in the HTTP request interpretation block. If the check of the HTTP request interpretation block is affirmative, information of the HTTP request is reported to the DTCP-IP authentication block.

The HTTP request management block is divided into an HTTP response generating block and an HTTP response transmitting block.

When the result of the check by the HTTP request interpretation block is affirmative, the HTTP request generating block creates an HTTP response for sending back encrypted content. The HTTP response includes at least one PCP. Alternatively, when the result of the check by the HTTP request interpretation block is negative, the HTTP request generating block creates an HTTP response for sending back an error.

The HTTP response transmitting block transmits the created HTTP response to a client at a requesting end. In addition, when the result of the check by the HTTP request interpretation block is affirmative, following an HTTP response header, content that is encrypted in the content encryption block in the DTCP-IP authentication block is transmitted.

Each of the DTCP-IP authentication block and the DTCP-IP content transmitting block establishes a separate TCP/IP connection to the source device, and independently executes an authentication procedure and a content transmission procedure.

The message digest generating block in the DTCP-IP authentication block of each of the DTCP-Sink device and the DTCP-Source device is not a functional module prescribed by DTCP-IP itself and does not directly relate to the gist of the present invention.

B. Content Transmission Using HTTP

Figure 4:
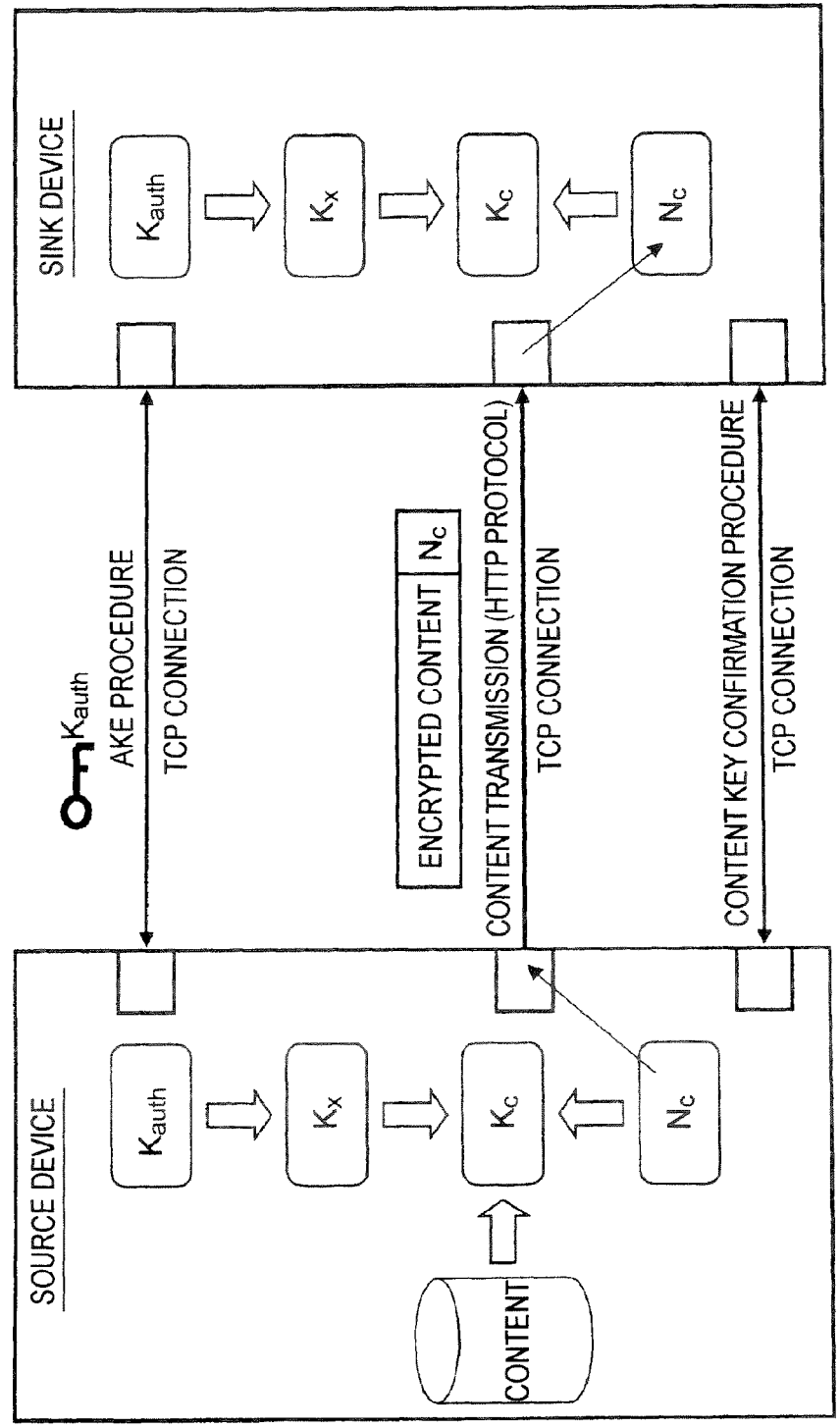
FIG. 4 is an illustration of a key exchange procedure based on AKE between the DTCP_Source device and the DTCP_Sink device, and a mechanism for performing encrypted content transmission using a key shared by key exchange.

In this section, a content transmission process complying with DTCP-IP is described. FIG. 4 illustrates a key exchange procedure based on AKE between the DTCP_Source device and the DTCP_Sink device, and a mechanism for performing encrypted content transmission using a key shared by key exchange.

First, the DTCP_Source and the DTCP_Sink establish a TCP/IP connection and authenticate each other. This authentication is called "DTCP authentication" or "authentication and key exchange (AKE)". In devices complying with DTCP, device certificates issued by DTLA (as described above) are embedded. In the DTCP authentication procedure, after the DTCP_Source device and the DTCP_Sink device confirm that each is an authorized device complying with DTCP, both can share an authentication key $K_{auth}$.

After the AKE procedure is successful, the DTCP_Source device generates a seed key $K_x$ which is used as a seed of a content key $K_c$, uses the authentication key $K_{auth}$ to encrypt the seed key $K_x$, and sends the encrypted key to the DTCP_Sink device. The seed key $K_x$ is used to generate the content key $K_c$ for encrypting content at a content transmission time. After devices complying with DTCP finish authentication based on AKE and a key exchange procedure, the DTCP_Sink device requests content from the DTCP_Source device. The DTCP_Source device can notify, through content directory service (CDS), beforehand the DTCP_Sink device of a content location representing a location in which the content on the DTCP_Source device is to be accessed. When requesting the content, the DTCP_Sink device can use a protocol such as HTTP or RTP.

In the case of requesting content in accordance with the HTTP procedure as shown in FIG. 4, the DTCP_Source device serves as an HTTP server and the DTCP_Sink device serves as an HTTP client, whereby content transmission is initiated. In addition, in the case of requesting transmission based on RTP, the DTCP_Source device serves as an RTP sender and the DTCP_Sink device serves as an RTP receiver, whereby content transmission is initiated. When content transmission is performed in accordance with HTTP, separately from the TCP/IP connection for DTCP authentication, a TCP/IP connection for HTTP is created by an HTTP client. In other words, each of the DTCP_Source device and the DTCP_Sink device has separate sockets (combinations of IP addresses and port numbers) for the AKE procedure and the content transmission. The HTTP client requests content from an HTTP server in accordance with an operating procedure that is completely identical to that in the case of common HTTP. In response to this request, the HTTP server sends back the requested content as an HTTP response.

Data transmitted as the HTTP response is data obtained by encrypting content by using a key shared after the HTTP server, that is, the DTCP_Source device, performs AKE authentication. Specifically, the DTCP_Source device generates nonce $N_c$ by using random numbers, and generates a content key $K_c$ based on seed key $K_x$, nonce $N_c$, and E-EMI representing an encryption mode. Specifically, content requested by the DTCP_Sink device is encrypted by using content key $K_c$ and a protected content packet (PCP) that includes a payload formed by the encrypted content, nonce $N_c$, and a header including an E-EMI is transmitted in a TCP stream. In an IP protocol, the TCP stream is divided into packet sizes, which serve as predetermined units, and is sent to a specified IP address in the form of IP packets each having an added header portion.

When receiving IP packets from the DTCP_Source device, the DTCP_Sink device converts the IP packets into a TCP stream and extracts a transmitted PCP. After extracting nonce $N_c$ and the E-EMI from the TCP stream, by similarly calculating content key $K_c$ by using the extracted nonce and E-EMI and seed key $K_x$, the DTCP_Source device can decrypt the encrypted content. The DTCP_Source device can perform processing, such as playback or recording, on plaintext content obtained by decryption. When content transmission using the HTTP protocol finishes, a TCP connection used is broken by, for example, the DTCP_Sink device, if needed.

In addition, if the same encryption key is continuously used for the entirety of a very long TCP stream, a possibility that the encryption key may be decrypted. Accordingly, DTCP-IP prescribes that the source device updates (increments by one) nonce $N_c$ or content key $K_c$ in units of 128 MB. The range of data encrypted by using content key $K_c$ generated from the same nonce $N_c$ in a byte stream serves as a decryption unit in which the data can be decrypted by using the same key.

In DTCP-IP, a content key confirmation procedure is further necessary. In other words, the DTCP_Sink device further establishes a TCP connection for content key confirmation separately from a TCP connection for content transmission, and performs a procedure for content key confirmation for the DTCP_Source device. When the DTCP_Sink device needs content key confirmation, the DTCP_Sink device establishes the TCP connection, if necessary. For example, DTCP-IP Volume 1 Supplement E.8.6 prescribes "Content Key Confirmation" as a content key confirmation procedure. According thereto, the sink device uses a CONT_KEY_CONF subfunction to confirm a content key which is associated with the current nonce $N_c$.

As already described, in DTCP-IP, content transmission is performed in a packet format called the "PCP" including a header including nonce $N_c$ and a payload formed by encrypted content.

Figure 5:
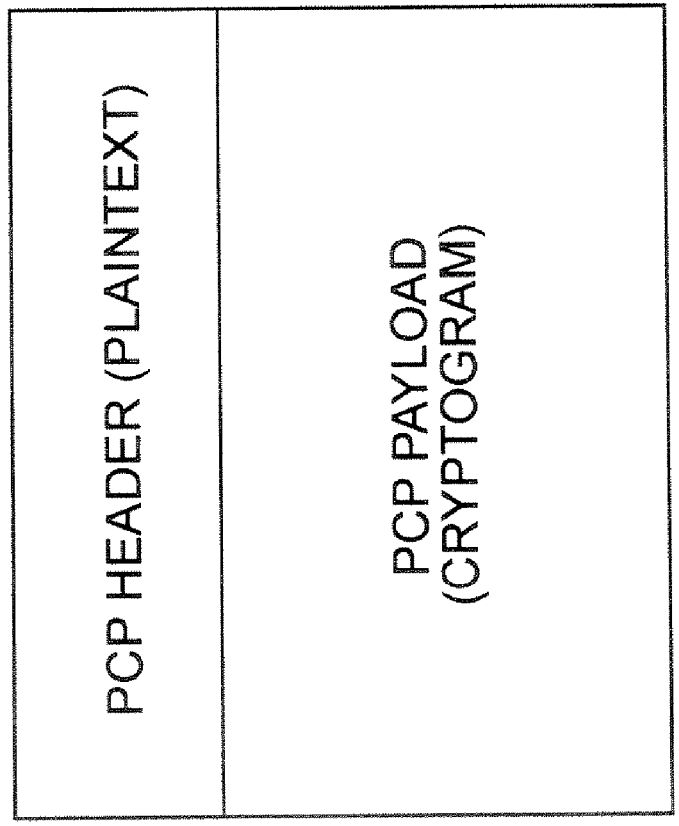
FIG. 5 is a schematic illustration of a PCP data structure.
Figure 6:
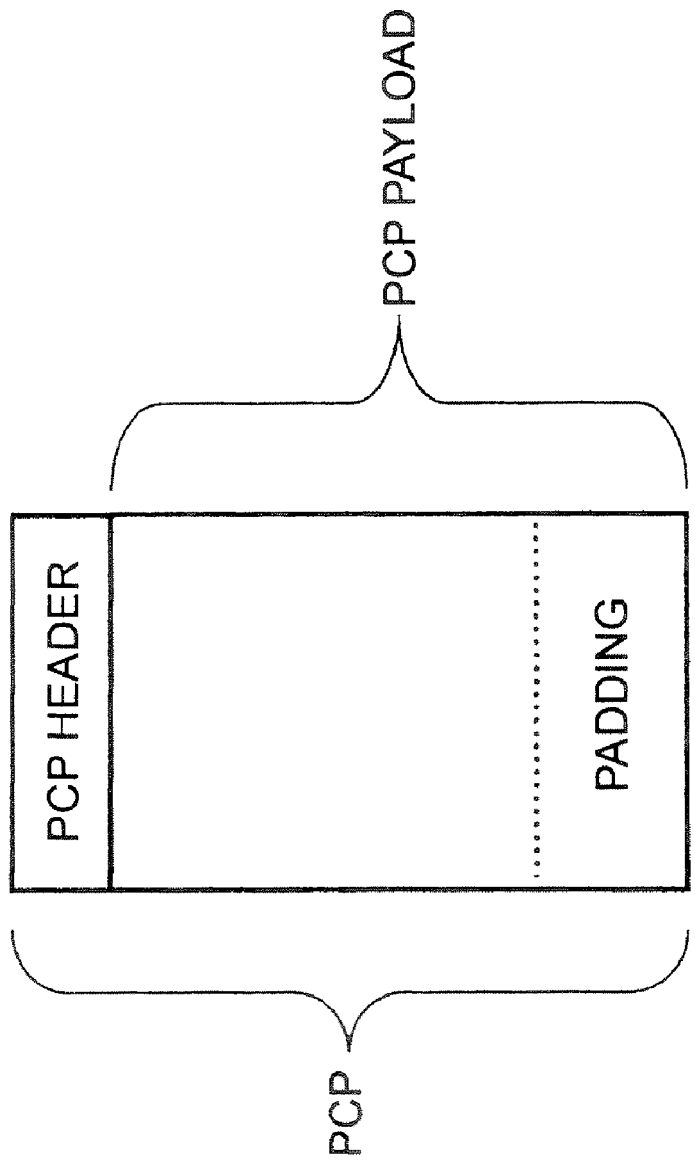
FIG. 6 is an illustration of padding on a PCP payload.

FIG. 5 is a schematic illustration of a PCP data structure. The PCP header is plaintext and includes nonce $N_c$. The PCP payload is formed by content (it is not necessary to encrypt content in which "copy-free" is specified as copy control information) which is encrypted by using content key $K_c$ determined by nonce $N_c$. Padding is performed on the PCP payload before encryption so that the PCP payload size is a multiple of 16 bytes at all times, if necessary. In addition, for content security, nonce $N_c$ or content key $K_c$ is periodically updated. Even at the time, the PCP is portioned (a plurality of PCPs can be portioned even if content key $K_c$ is not updated). When the value of a protected_content_length is not an integer multiple of 16, padding of 1 to 15 bytes is performed on the content. Activation of the content key confirmation procedure in response to updating of nonce $N_c$ is as described above. The HTTP response includes at least PCP, and the RTP payload includes at least one PCP. FIG. 6 shows padding on the PCP.

C. Transmission of Copy Control Information

In a content transmission system intended to protect copyright, such as DTCP-IP, when content is encrypted and transmitted, it is necessary to specify a content attribute concerning content protection.

DTCP-IP prescribes that the PCP header includes a 4-bit E-EMI field for specifying an encryption mode and copy information of the PCP payload, and prescribes that copy control information Embedded CCI is transmitted as part of the PCP payload or a content stream. However, it is only prescribed that Embedded CCI is described as a DTCP descriptor only for an MPEG transport stream. Actually, the definition and format of Embedded CCI differ for each content format. Accordingly, a description method of Embedded CCI is dependent on a content format, and a software or hardware module for creating and decoding copy control information needs to be prepared for each format, so that a problem occurs in that the device cost increases.

Accordingly, in this embodiment, in a DTCP-IP system of the related art in which content is transmitted in an encrypted form, with an E-EMI written in a PCP header, and with a portion of copy control information embedded as an Embedded CCI, the portion being an excess over a portion of the copy control information written in the header, a content transmission system in which, while maintaining compatibility between source and sink devices of the related art, that is, legacy source and sink devices, necessary copy control information is all written in the PCP header.

When the copy control information is embedded in the PCP header, the copy control information can be transmitted in a form common to all content formats since the copy control information is not dependent on a content format. As a result, the source device creates copy control information and, in the sink device, software or hardware modules for analyzing copy control information are set to be common to all formats, whereby device costs can be reduced.

As described above with reference to FIG. 31, the PCP header includes a nonce information field as well as an E-EMI. Since the E-EMI field occupies only 4 bits, it is difficult for the field to have other copy control information, that is, superextended copy control information. In addition, nonce $N_c$ is information that serves as a basis for generating content key $K_c$ for encrypting content, and a field having a length of 64 bits is allocated to nonce $N_c$ in the header. Nonce $N_c$ is updated whenever an E-EMI changes in content or periodically. Normally, the value of nonce $N_c$ is monotonously increased (incremented by one) whenever updating is performed. Thus, 64 bits are not necessary. Accordingly, in this embodiment, the superextended copy control information can be transmitted by using a portion of a nonce information field in the PCP header of the related art.

Figure 7:
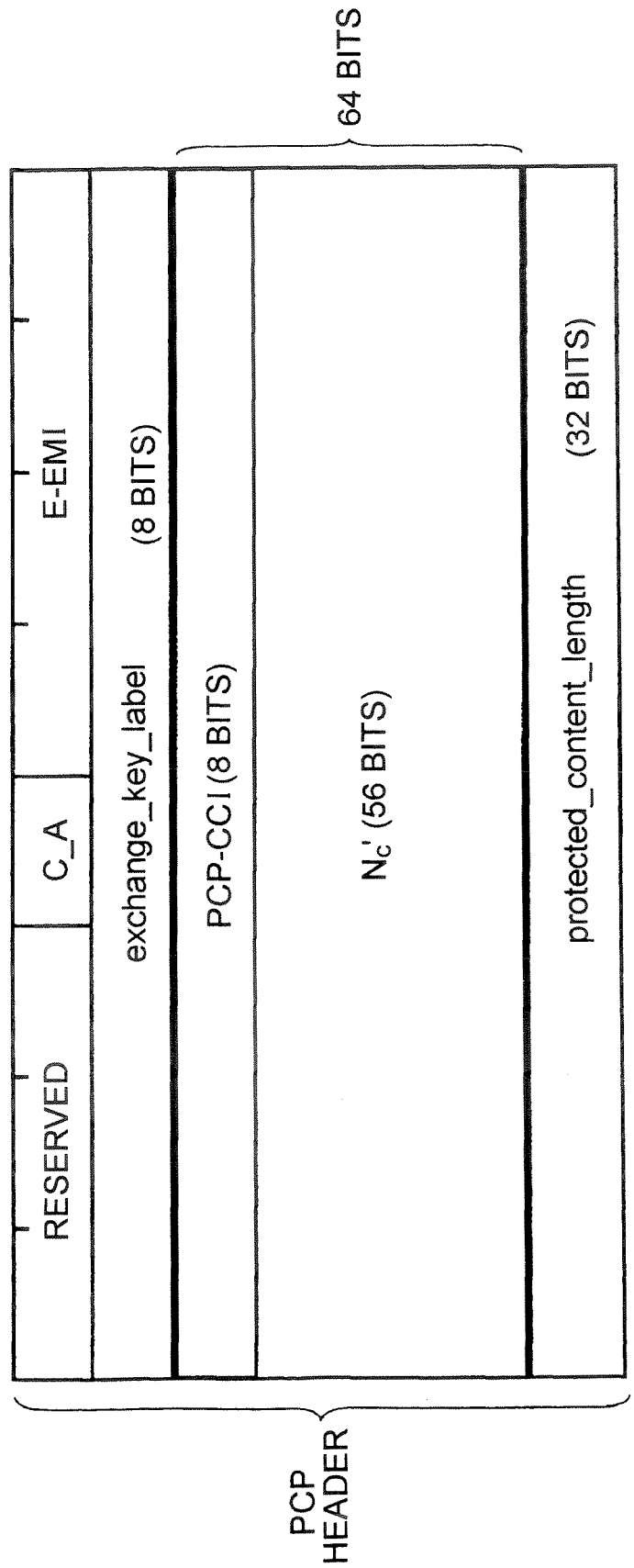
FIG. 7 is an illustration of a PCP header data structure in the embodiment of the present invention.

In this specification, superextended copy control information that is inserted in the PCP header in addition to the E-EMI is called "PCP-CCI". FIG. 7 shows a PCP header data structure employed in this embodiment. In the example in FIG. 7, upper 8 bits of the nonce information field in the PCP header of the related art are used to describe PCP-CCI. The other lower 56 bits are used to describe the value of nonce $N_c'$ which is normally generated. Even if the PCP-CCI is embedded in the upper 8 bits of the 64-bit nonce information $N_c$ field, content key $K_c$ has security for practical use by using the remaining 56 bits.

As is clear from FIG. 7, the basic structure and size of the PCP header are not different from those in the PCP header of the related art. In this case, source and sink devices that are compliant to the content transmission method according to this embodiment use, as a PCP-CCI field, upper 8 bits in the 64-bits nonce information field in the related art, and generates content key $K_c$ by using, as nonce $N_c$, the entirety of 64 bits formed by a bit concatenation of the upper 8 bits containing the PCP-CCI information and 56 bits containing a pseudo value of nonce $N_c'$. Even if, in this case, the PCP-CCI is altered for the purpose of unauthorized copying, nonce $N_c$ is altered, so that, finally, content cannot be decrypted. Thus, the security is also maintained.

Also a device of the related art interprets, as nonce $N_c$, a value written in the entirety of the 64-bit nonce information field in the related art. In this case, since the PCP-CCI is written in the upper 8 bits, contiguousness of values of nonce $N_c$ is lost when the PCP-CCI changes in the middle of the stream, so that a so-called "legacy problem" occurs in a sink device that does not handle the transmission method according to an embodiment of the present invention. In addition, it is necessary for also a sink device that are compliant to the transmission method according to an embodiment of the present invention to determine whether a PCP, that is, a source device, which is a content transmitter, uses the method, that is, whether the upper 8 bits contain PCP-CCI. Accordingly, a legacy problem similarly occurs. A method for solving this problem is described later.

Figure 8:
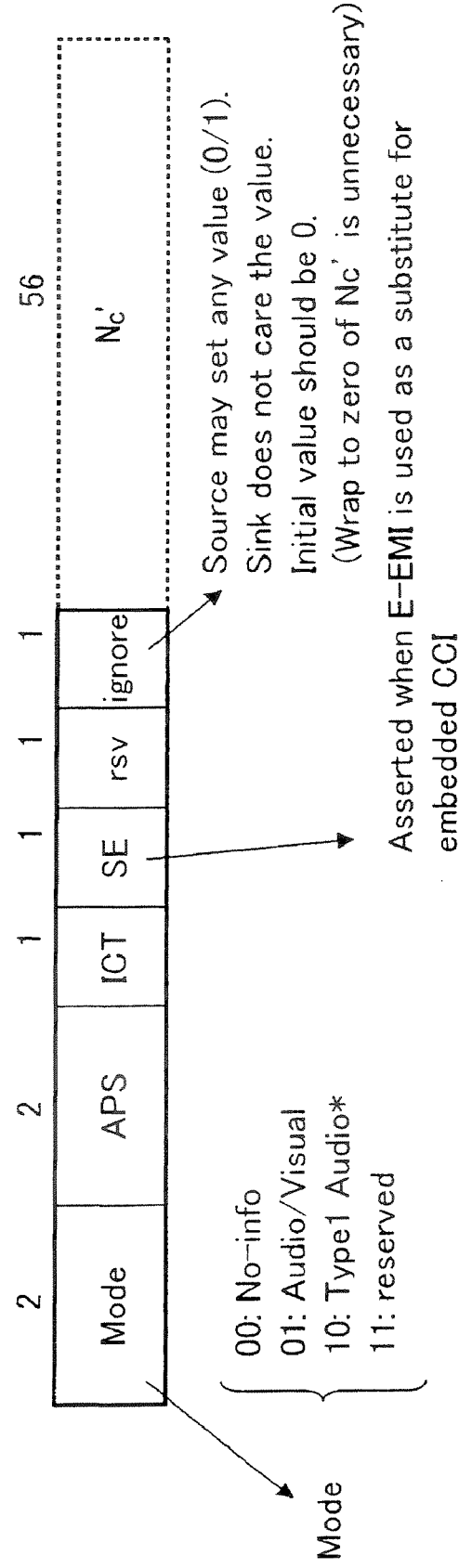
FIG. 8 is an illustration of an example of a format configuration of the PCP-CCI field.

FIG. 8 shows an example of a format configuration of the PCP-CCI field.

In DTCP, pieces of output control information, such as a 2-bit parameter (APS) concerning analog output control and a 1-bit information flag (ICT) concerning a picture size in an output mode, are elements of copy control information. These pieces of information, which are excesses over information written in E-EMI, are allocated in the PCP-CCI. An Ignore bit is a field in which, even if the value of pseudo nonce $N_c'$ of the lower 56 bit is incremented by count-up of pseudo nonce $N_c'$, the field prevents the other fields of the PCP-CCI from being affected. In the source device, "0" is set as an initial value of the Ignore bit. The Ignore bit is set to "1" when the value of pseudo nonce $N_c'$ is incremented by count-up of pseudo nonce $N_c'$.

In addition, the 2-bit information field "Mode" which describes the validity of the PCP-CCI, and the 1-bit information flag "SE (Substitute for Embedded CCI)" concerning a possibility of substitution of E-EMI and the original Embedded CCI are also allocated in the PCP-CCI. By employing the above PCP-CCI as part of the header, the copy control information can be transmitted in a form common to all formats without depending the format of content. Even if an encrypted payload includes no Embedded CCI, a copy-control function specified in the related art by a combination of Embedded CCI and an EMI, that is, a cognizant function, can be realized.

The Mode bit field represents the meaning or validity of the PCP-CCI field. When Mode=00b, it is indicated that the PCP-CCI field has no information. When Mode=01b, it is indicated that the payload is audio/visual content. When Mode=10b, it is indicated that the payload is type-1 audio content (see, for example, DTCP Specification, Volume 1, Version 1.4 (Informational Version), Appendix A, Additional Rules for Audio Applications). When Mode=11b, it is indicated that the field is reserved. In addition, when Mode=01b or Mode=10b, it is indicated that the field has an APS or ICT bit meaning, and the meaning of the bits comply with provisions of DTCP (see Digital Transmission Content Protection Specification Volume 1 (Informational Version), Revision 1.4, Appendix B, DTCP_Descriptor for MPEG Transport Streams).

Figure 9:
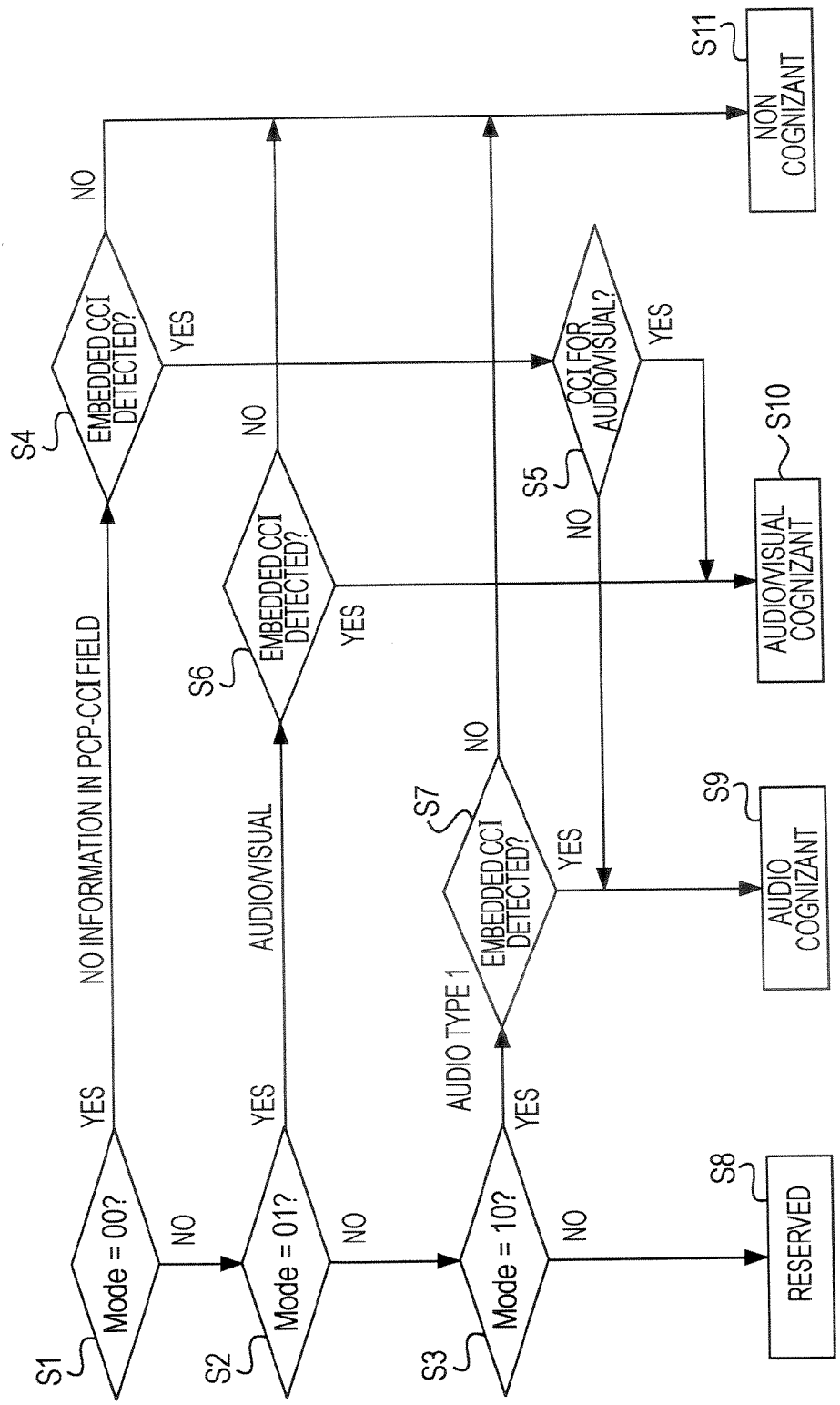
FIG. 9 is a flowchart showing a process in which a sink device identifies the meaning of a PCP-CCI field on the basis of a Mode bit field.

FIG. 9 is a flowchart showing a process in which a sink device identifies the meaning of a PCP-CCI field on the basis of a Mode bit field.

When Mode=00b, that is, when the PCP-CCI field has no information (Yes in step S1), decrypted content is also checked. Accordingly, if the sink device is unable to detect recognizable Embedded CCI (No in step S4), content processing is performed, with this state regarded as Non Cognizant (step S11). Alternatively, if the Embedded CCI can be detected (Yes in step S4), it is determined whether or not the detected Embedded CCI is copy control information for audio/visual use (step S5). If the detected Embedded CCI is copy control information for audio/visual use, content processing is performed, with this state regarded as Audio/Visual Cognizant (step S10). If not, content processing is performed, with this state regarded as Audio Cognizant (step S9).

When Mode=01b, that is, when the PCP-CCI field is Audio/Visual information (Yes in step S2), decrypted content is inspected. Accordingly, if the sink device is unable to detect recognizable Embedded CCI (No in step S6), content processing is performed, with this state regarded as Non Cognizant (step S11). Alternatively, if the Embedded CCI has been detected, content processing is performed, with this state regarded as Audio/Visual Cognizant (step S10).

When Mode=10b, that is, when the PCP-CCI field is information of Audio Type 1 (Yes in step S3), decrypted content is inspected. If the sink device is unable to detect recognizable Embedded CCI (No in step S7), content processing is performed, with this state regarded as Non Cognizant (step S11). Alternatively, if the Embedded CCI can be detected, content processing is performed, with this state regarded as Audio Cognizant.

If the Mode has a value other than the above values, that is, 11b, the Mode is regarded as reserved (step S8).

Figure 10:
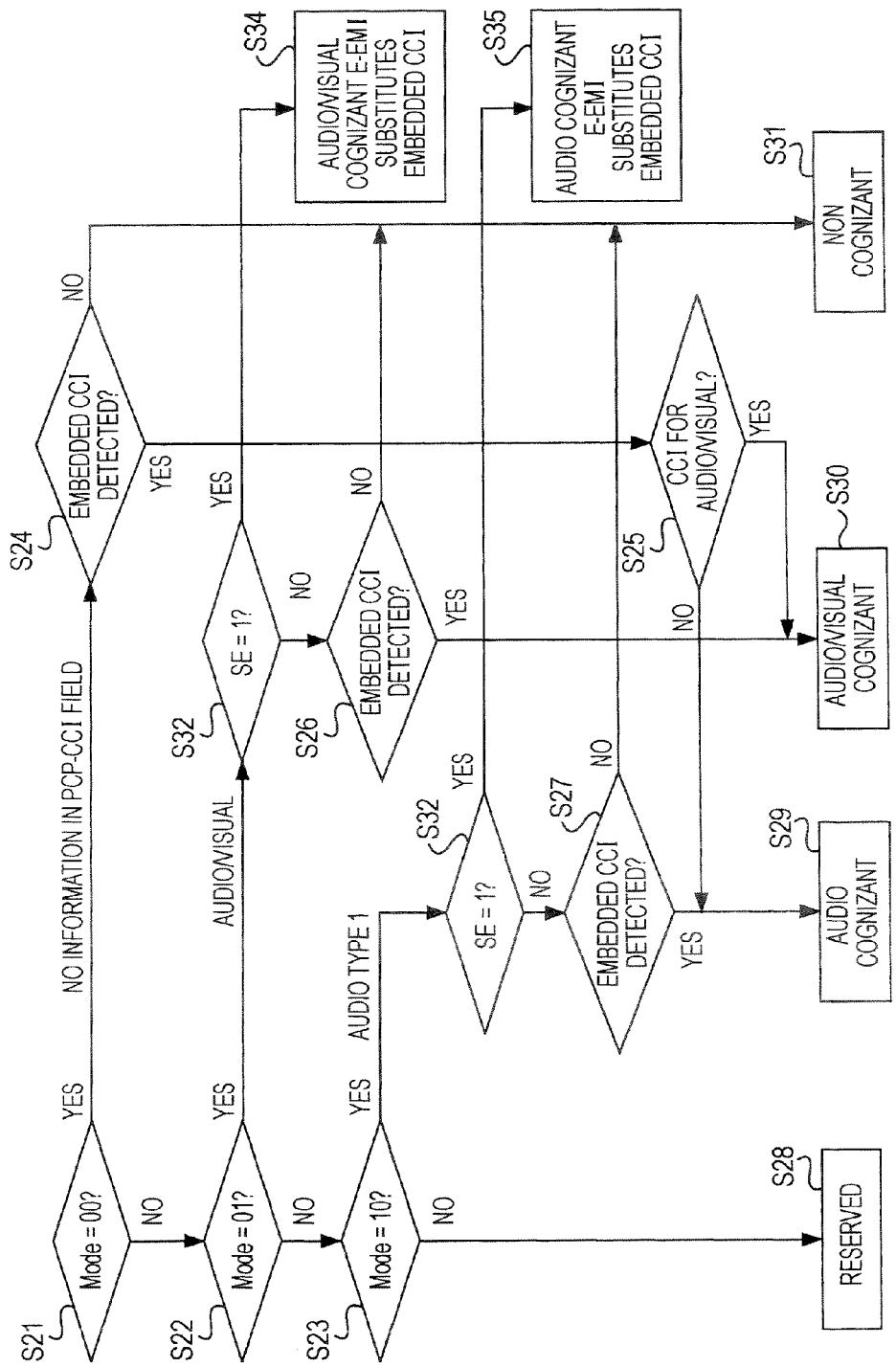
FIG. 10 is a flowchart showing a process in which the sink device identifies the meaning of a PCP-CCI field on the basis of a combination of the Mode bit field and an SE bit flag.

A process for identifying the meaning of the PCP-CCI field on the basis of the Mode bit field is shown in FIG. 9. In a modification of the process, the meaning of the PCP-CCI field can be identified on the basis of a combination of the Mode bit field and the SE bit flag. FIG. 10 is a flowchart showing a process in this case.

When Mode=00b, that is, when the PCP-CCI field has no information (Yes in step S21), decrypted content is inspected. Accordingly, if the sink device is unable to detect recognizable Embedded CCI (No in step S24), content processing is performed, with this state regarded as Non Cognizant (step S31). Alternatively, if the Embedded CCI has been detected (Yes in step S24), it is determined whether the detected Embedded CCI is CCI for Audio/Visual use (step S25). If the detected Embedded CCI is the CCI for Audio/Visual use, content processing is performed, with this state regarded as Audio/Visual Cognizant (step S30). If not, content processing is performed, with this state regarded as Audio Cognizant (step S29).

In addition, when Mode=01b, that is, when the PCP-CCI field is Audio/Visual information (Yes in step S22), the SE bit flag is checked. If SE=1b (Yes in step S32), content processing is performed, with this state regarded as Audio/Visual Cognizant, and an E-EMI is substituted for Embedded CCI (step S34).

When Mode=01b (Yes in step S22), and not in the case of SE=1b (No in step S32), decrypted content is inspected. Accordingly, if the sink device is unable to detect recognizable Embedded CCI (No in step S26), content processing is performed, with this state regarded as Non Cognizant (step S31). Alternatively, if the Embedded CCI can be detected, content processing is performed, with this state regarded as Audio/Visual Cognizant (step S30).

In addition, when Mode=10b, that is, the PCP-CCI field is Audio Type 1 information (Yes in step S23), the SE bit flag is checked. Here, when SE=1b (Yes in step S33), content processing is performed, with this state regarded as Audio Cognizant, and the E-EMI is substituted for the Embedded CCI (step S35).

Also, when Mode=10b (Yes in step S23) and not in the case of SE=1b (No in step S33), decrypted content is inspected. If the sink device is unable to detect recognizable Embedded CCI (No in step S27), content processing is performed, with this state regarded as Non Cognizant (step S31). Alternatively, if the Embedded CCI can be detected, content processing is performed, with this state regarded as Audio Cognizant (step S29).

Also, when Mode=10b (Yes in step S23) and not in the case of SE=1b (No in step S33), decrypted content is inspected. If the sink device is unable to detect recognizable Embedded CCI (No in step S27), content processing is performed, with this state regarded as Non Cognizant (step S31). Alternatively, if the Embedded CCI has been detected, content processing is performed, with this state regarded as Audio Cognizant (step S29).

When the Mode has a value other the above values, that is, 11b, the Mode is reserved.

Figure 11:
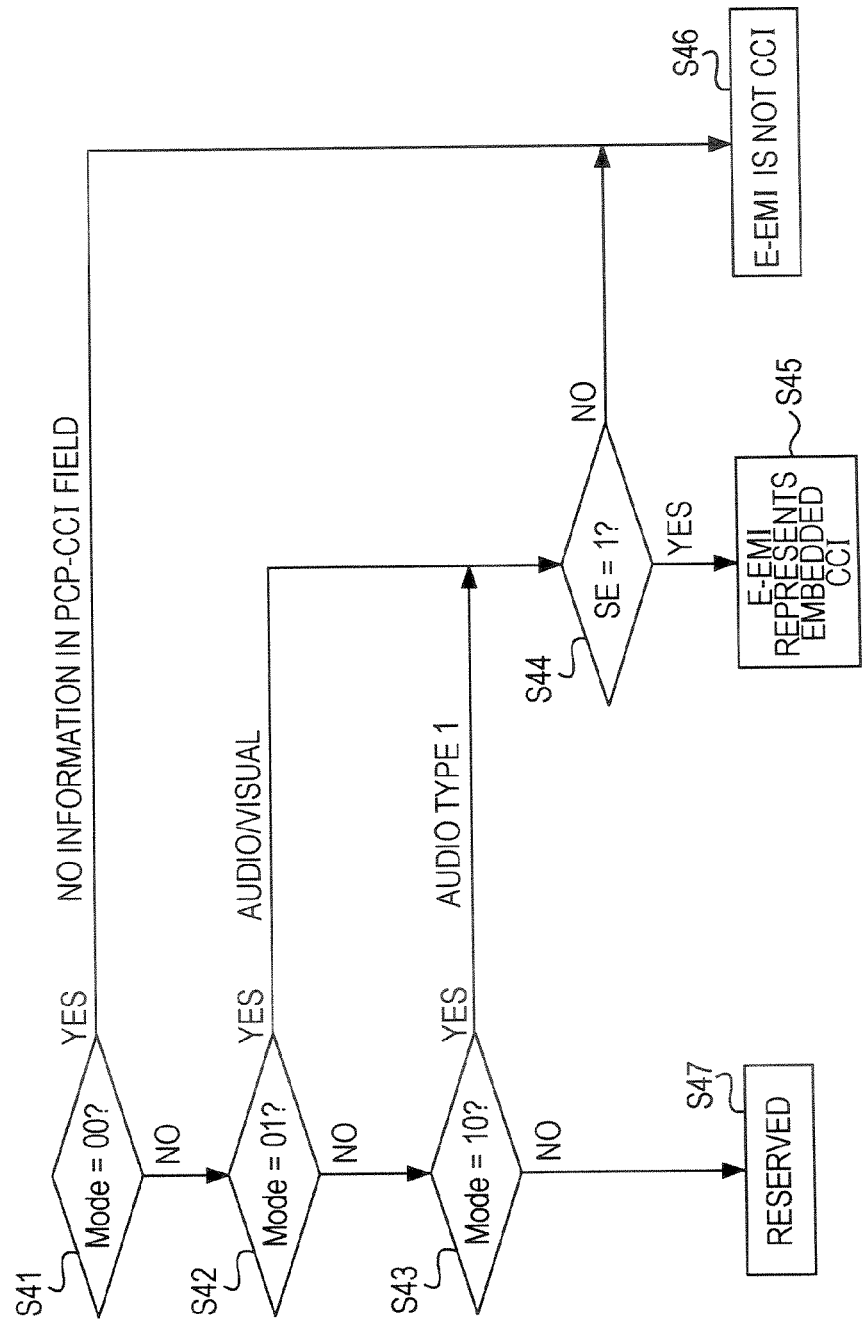
FIG. 11 is a flowchart showing a process for determining, on the basis of a combination of the Mode bit field value and the SE bit flag value, whether the E-EMI can be substituted for the Embedded CCI.

When SE=1b, it is indicated that, since the Embedded CCI is not included in content, the E-EMI field is substituted for the Embedded CCI. FIG. 11 is a flowchart showing a process for determining, on the basis of a combination of the Mode bit field value and the SE bit flag value, whether the E-EMI can be substituted for the Embedded CCI.

When Mode=00b, the PCP-CCI field has no information (Yes in step S41), and the E-EMI cannot be substituted for the Embedded CCI (step S46).

When Mode=01b, that is, the PCP-CCI field is Audio/Visual information (step S42), and, when Mode=10b, that is, the PCP-CCI field is Audio information (step S43), the flag value of the SE bit is confirmed (step S44).

If the SE flag has been set, it is determined that the E-EMI can be substituted for the Embedded CCI (step S45). Alternatively, if the SE flag has not been set, it is determined that the E-EMI cannot be substituted for the Embedded CCI (step S46).

When the Mode has a value other the above values, that is, 11b, the Mode is reserved (step S46).

D. Solution to Legacy Problems

In the above-described embodiment, in an encrypted transmission method that employs a method for describing copy control information in a form divided into a header and payload (that is, a content stream) of each packet, by describing PCP-CCI with upper 8 bits of the nonce information field in the PCP header and writing pseudo nonce $N_c'$ in the remaining lower 56 bits, all copy control information necessary for realizing copy control requested (in DTCP-IP) can be described in a header. In this case, copy control information can be inserted in the header in a form which is not dependent on a content format and which is common to all formats. Software or hardware modules for analyzing copy control information are set to be common to all formats, whereby device costs can be reduced.

However, in the case of a legacy source device, writing of PCP-CCI in upper 8 bits loses contiguousness of values of nonce $N_c$ when the PCP-CCI is changed since a value written in the entire nonce information field of 64 bits is interpreted as nonce $N_c$, so that a legacy problem occurs in that a content key confirmation procedure is activated. Also, for a sink device adapted for a transmission method according to an embodiment of the present invention, it is necessary to specify whether a source device, which is a content transmitter, uses the method, that is, whether PCP-CCI is written in a PCP header, so that a legacy problem similarly occurs. In this section, solutions to these legacy problems are described below.

Figure 12:
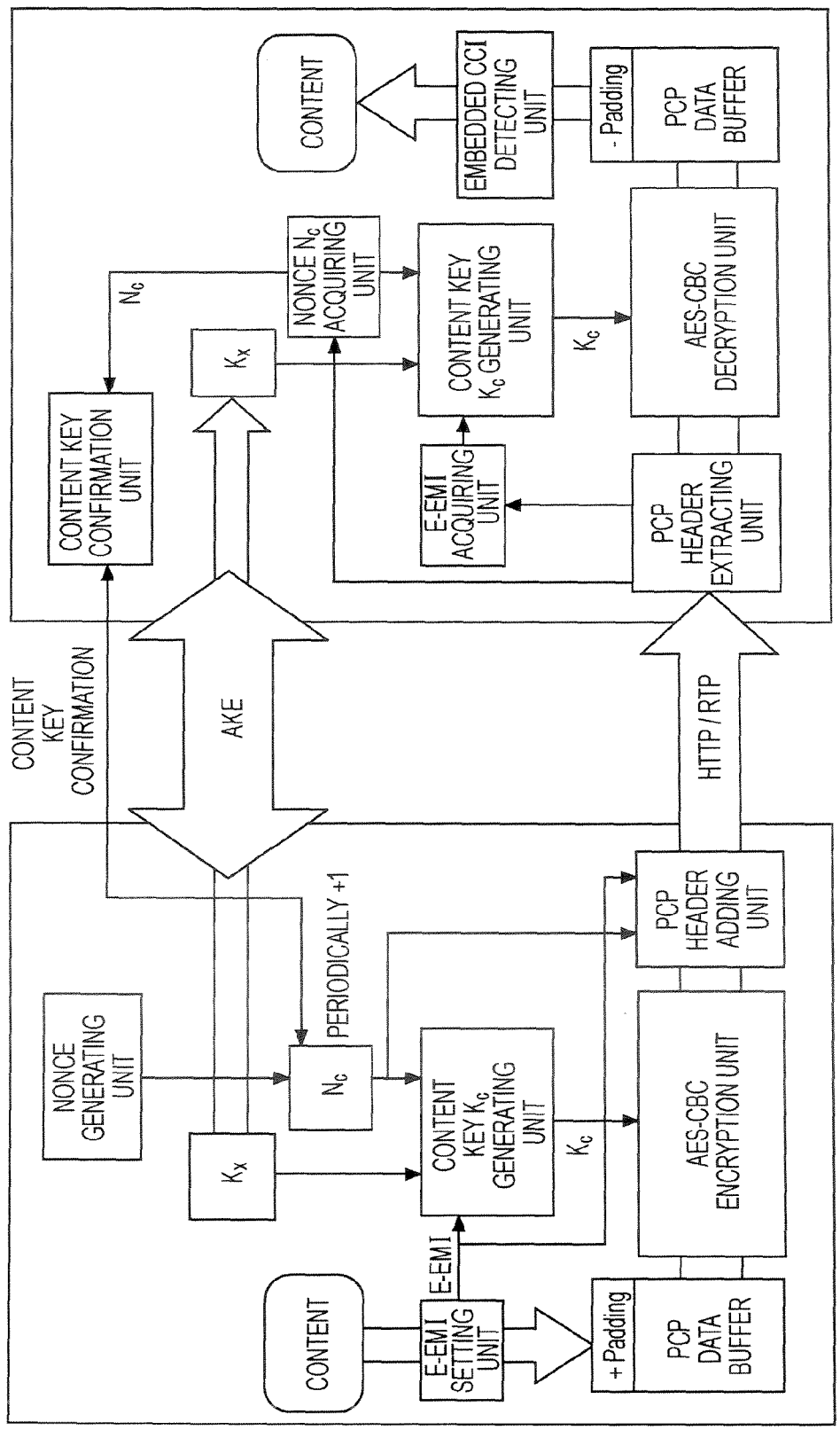
FIG. 12 is a block diagram illustrating a PCP transmission mechanism between a legacy source device and a legacy sink device.

FIG. 12 illustrates a PCP transmission mechanism between a legacy source device and a legacy sink device.

After generating seed key $K_x$, the source device uses the AKE procedure to share seed key $K_x$ with the sink device.

When transmission content is supplied from a higher level application to the source device, an E-EMI setting unit selects a correct encryption mode in accordance with copy control information associated with a content stream and sets an E-EMI on the basis of the selected encryption mode. The E-EMI setting unit performs padding so that data size is a multiple of 16 bytes at all times, and temporarily stores the obtained data in a PCP data buffer.

A content key generating unit generates content key $K_c$ by performing predetermined arithmetic processing on seed key $K_x$, the E-EMI, and 64-bit nonce $N_c$ generated in random number generation by a nonce generating unit. Nonce $N_c$ is periodically incremented by one by the nonce generating unit. Also content key $K_c$ is accordingly, periodically updated.

An AES-CBC (Advances Encryption Standard-Cipher Block Chaining) unit sequentially extracts a padded PCP payload from the PCP data buffer and uses the current content key $K_c$ to perform encryption processing on the payload.

Figure 31:
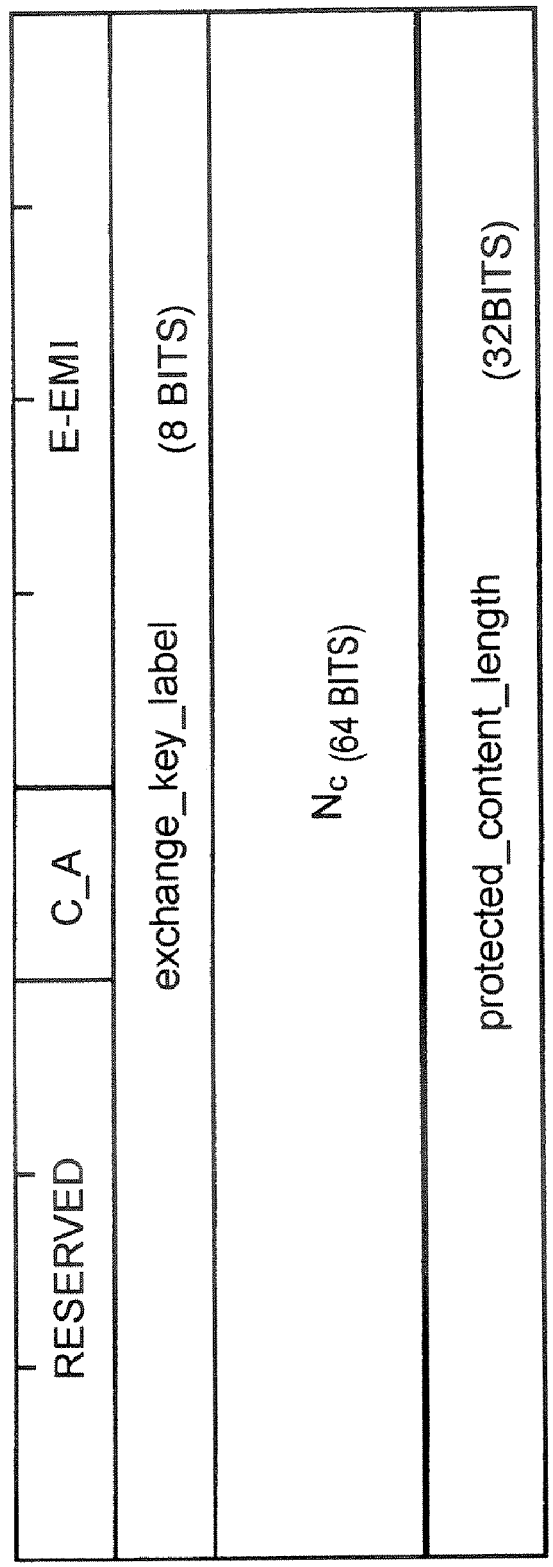
FIG. 31 is an illustration of an internal structure of a PCP header.

A PCP header adding unit generates a PCP header including the E-EMI set by the E-EMI setting unit, and completes a PCP by adding the PCP header to the start of the encrypted payload. The data format of the generated PCP header is as shown in FIG. 31. The source device sends the PCP in accordance with a protocol, such as HTTP or RTP, requested by the sink device as a content requesting device.

The sink device shares seed key $K_x$ by performing an AKE procedure between the sink device and the source device.

After the sink device receives the PCP from the source device in accordance with the protocol such as HTTP or RTP, a PCP header extracting unit separates the PCP into a PCP header and a PCP payload. From the PCP header, nonce $N_c$ and an E-EMI are extracted.

A content key generating unit generates content key $K_c$ by performing predetermined arithmetic processing on seed key $K_x$ and the E-EMI and nonce $N_c$ extracted from the PCP header. A content key confirmation unit inspects contiguousness of nonce $N_c$, and activates a content key confirmation procedure when detecting discontiguousness.

An AES-CBC decryption unit uses the current content key $K_c$ to perform decryption processing on the PCP payload. The decrypted PCP payload is temporarily stored in the PCP data buffer. By extracting the padded data, the original content is reproduced. An Embedded CCI detecting unit inspects the reproduced content to detect Embedded CCI.

Figure 13:
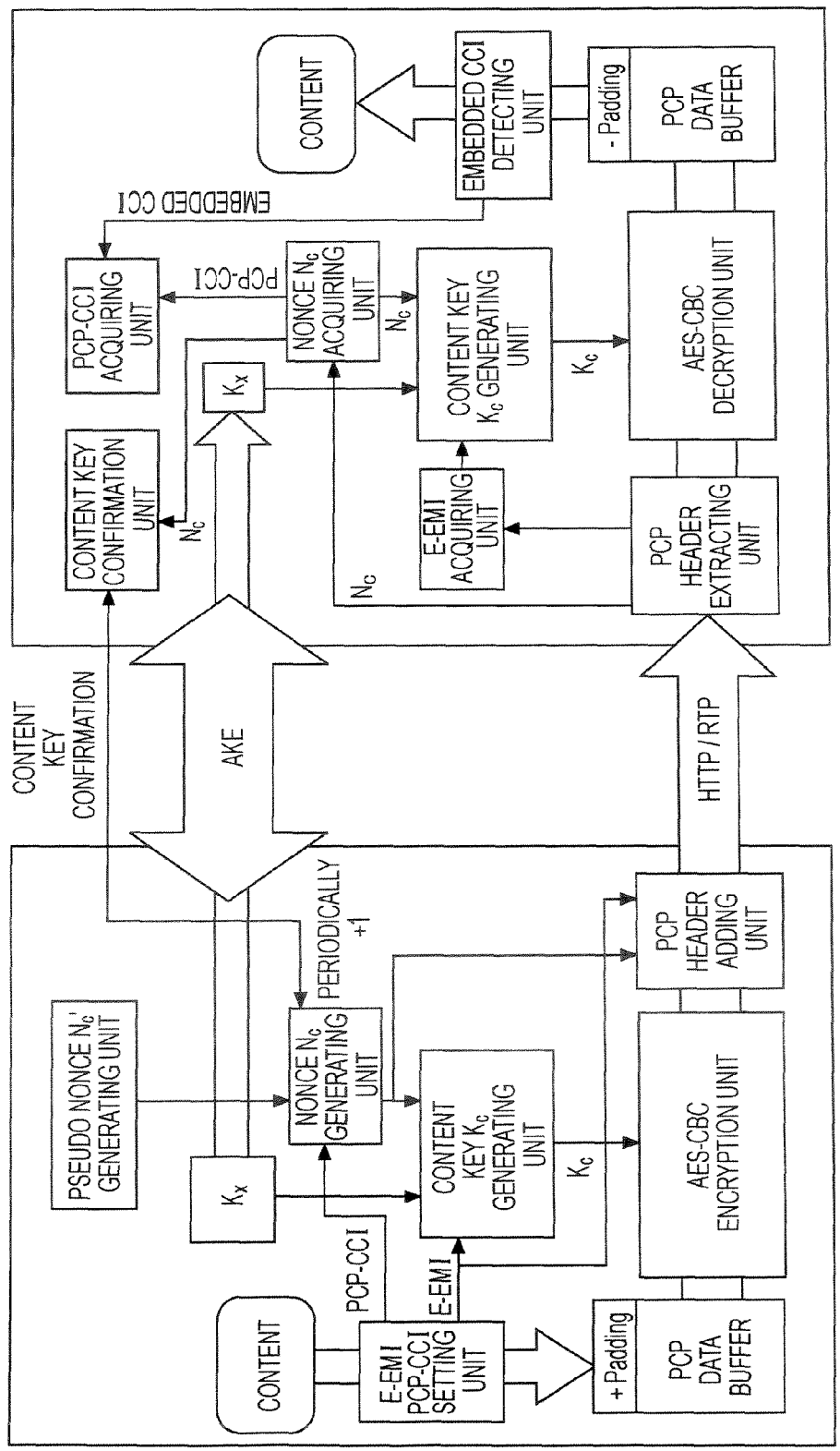
FIG. 13 is a block diagram illustrating a PCP transmission mechanism between source and sink devices to which a transmission method for embedding PCP-CCI in a PCP header is applied.

FIG. 13 illustrates a PCP transmission mechanism between source and sink devices to which a transmission method for embedding PCP-CCI in a PCP header is applied.

After generating seed key $K_x$, the source device shares seed key $K_x$ with the sink device by performing an AKE procedure.

When transmission content is supplied from a higher level application to the source device, an E-EMI PCP-CCI setting unit selects a correct encryption mode in accordance with copy control information associated with a content stream, sets an E-EMI on the basis thereof, and sets PCP-CCI. Regarding a method for setting a Mode bit field and an SE bit flag in PCP-CCI, see Digital Transmission Content Protection Specification Volume 1 (Informational Version), Revision 1.4, Appendix B DTCP_Descriptor for MPEG Transport Streams. The PCP-CCI has a length of 8 bits, and its data format is as shown in FIG. 8. In addition, padding is performed so that the data size of the PCP-CCI is a multiple of 16 bytes at all times, and the obtained data is temporarily stored in a PCP data buffer.

A pseudo nonce $n_c'$ generating unit generates 56-bit pseudo nonce $N_c$ by performing random number generation or the like. A nonce $N_c$ generating unit generates 64-bit nonce $N_c$ by bit-concatenating PCP-CCI with upper bits of pseudo nonce $N_c'$.

A content key generating unit generates content key $K_c$ by performing predetermined arithmetic processing on seed key $K_x$, the E-EMI, and the 64-bit nonce $N_c$ generated by the nonce $N_c$ generating unit. Since nonce $N_c$ is periodically incremented by one by the nonce $N_c$ generation unit, also content key $K_c$ is periodically updated in accordance therewith. However, if PCP-CCI changes, the contiguousness of nonce $N_c$ treated by the entirety of 64 bits is lost even if the portion of pseudo nonce $N_c'$ is continuous.

An AES-CBC encryption unit sequentially extracts the padded PCP payload from the PCP data buffer, and uses the current content key $K_c$ to perform encryption processing on the extracted payload.

A PCP header adding unit generates a PCP header including the E-EMI set by the E-EMI setting unit, and completes a PCP by adding the PCP header to the start of the encrypted payload. The data format of the generated PCP header is as shown in FIG. 7. The source device sends the PCP in accordance with a protocol, such as HTTP or RTP, requested by the sink device as a content requesting device.

The sink device shares seed key $K_x$ by performing an AKE procedure between the sink device and the source device.

After the sink device receives the PCP from the source device in accordance with the protocol such as HTTP or RTP, a PCP header extracting unit separates the PCP into a PCP header and a PCP payload. From the PCP header, nonce $N_c$ and an E-EMI are extracted.

A nonce $N_c$ acquiring unit acquires 64-bit nonce information in the PCP header. A content key confirmation unit inspects the contiguousness of lower 56 bits of nonce $N_c$, and activates a content key confirmation procedure when detecting discontiguousness.

A content key generating unit generates content key $K_c$ by performing predetermined arithmetic processing on seed key $K_x$ and the 64-bit nonce $N_c$ extracted from the PCP header.

In addition, a PCP-CCI acquiring unit acquires, as PCP-CCI, upper 8 bits in the 64-bit nonce information field from the nonce $N_c$ acquiring unit. On the basis of the Mode bit field and SE-bit-flag bit value of the PCP-CCI, and the result of detection by an Embedded CCI detecting unit, in accordance with the process shown in FIG. 10, content format cognizance and Embedded CCI substitution of E-EMI are determined.

An AES-CBC decryption unit uses the current content key $K_c$ to perform decryption processing on the PCP payload. The decrypted PCP payload is temporarily stored in the PCP data buffer. By extracting the padded data, the original content is reproduced. An Embedded CCI detecting unit inspects the reproduced content to detect Embedded CCI.

Here, the PCP-CCI is described in a plaintext state in the PCP header. Thus, alteration of the PCP-CCI is facilitated compared than the case of encrypting PCP-CCI in a form encrypted in the PCP payload. However, since the PCP-CCI forms the upper 8 bits of nonce $N_c$, alteration of the PCP-CCI alters nonce $N_c$, that is, content key $K_c$. This results in inability to decrypt content, thus maintaining security.

Figure 14:
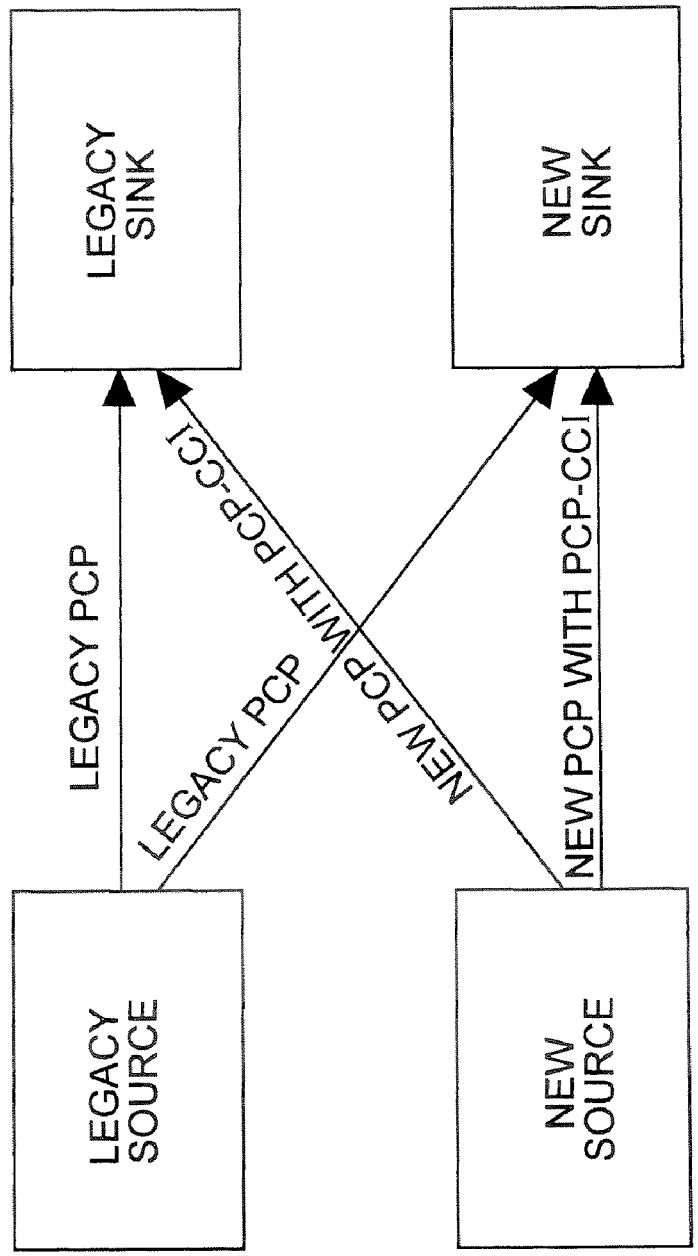
FIG. 14 is a schematic illustration of the occurrence of legacy problems in a content transmission environment having both the legacy source and sink devices shown in FIG. 12 and the new source and sink devices shown in FIG. 13.

FIG. 14 is a schematic illustration of the occurrence of legacy problems in a content transmission environment having both the legacy source and sink devices shown in FIG. 12 and the new source and sink devices shown in FIG. 13.

As described above, PCP transmission between the source and sink devices shown in FIG. 12 and PCP transmission between the source and sink devices shown in FIG. 13 are performed with no difficulties.

Unlike that, when the legacy sink device receives a PCP (indicated by "New PCP with PCP-CCI") in which PCP-CCI is embedded in a PCP header sent by the new source device, the PCP-CCI is written in the upper 8 bits of nonce $N_c$, whereby the value contiguousness of nonce $N_c$ is lost (for example, when PCP-CCI information changes). Thus, a first legacy problem of activating a content key confirmation procedure occurs.

Also, in the case of the legacy sink device, which is compliant to a PCP (indicated by "New PCP with PCP-CCI") in which PCP-CCI is embedded in a PCP header, a second legacy problem occurs in that it is necessary to determine to which of legacy and new types the source device, which requests content, belongs. False determination causes inability to read the PCP-CCI embedded in the PCP header, or causes a situation in which the upper 8 bits of the 64-bit nonce information field are recognized as PCP-CCI.

Regarding the first legacy problem, although the content key confirmation procedure is activated, in response to a content key confirmation request, the sink device sends back a response (ACCEPTED command) representing no error in nonce $N_c$. Thus, after that, the legacy sink device can continue a content receiving process with no difficulties, so that no practical problem occurs.

DTCP-IP Volume 1 Supplement E DTCP Mapping to IP Section V1SE.8.6 provides content key confirmation. According to this provision, a sink device confirms the value of nonce $N_c$ of the most recently received PCP, and must reconfirm subsequent dynamically-changed nonce $N_c$ every 2 minutes. However, periodic content key confirmation can be avoided if the sink device monitors and confirms that subsequent $N_c$ values are monotonically increasing contiguous values. The sink device uses the CONT_KEY_CONF subfunction to confirm the content key associated with the current nonce $N_c$.

For each content stream, before the sink device must terminate encrypted content decryption for the content stream after acquiring initial nonce which has not been confirmed yet, the sink device is given a time of one minute to repeatedly attempt content key confirmation. When the sink device uses the given time to succeed in confirming nonce $N_c$, the sink device can continue an encrypted content decrypting operation without terminating the operation.

Figure 15:
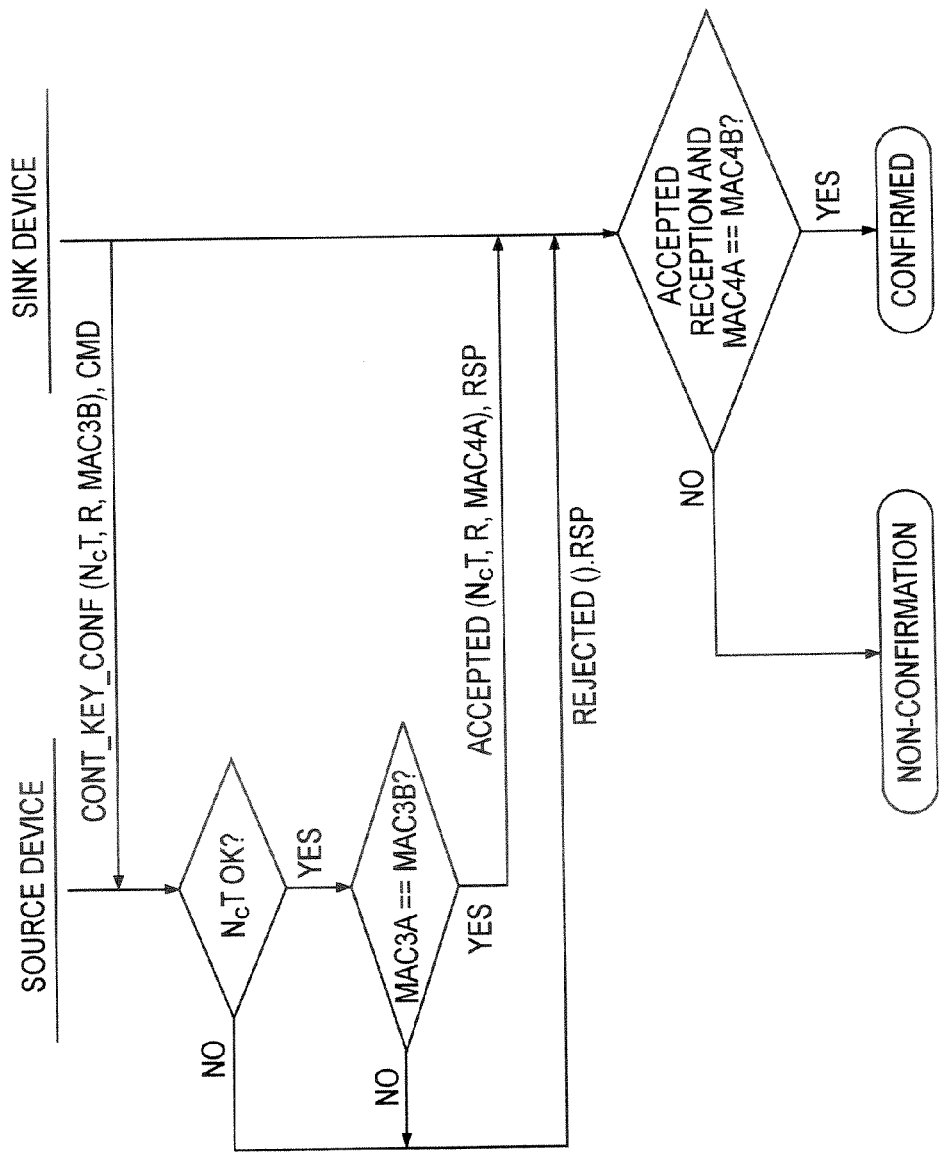
FIG. 15 is a flowchart showing a content key confirmation procedure between a sink device and a source device.

FIG. 15 shows a content key confirmation procedure between a sink device and a source device. In the procedure, R represents a 64-bit value, and its initial value is a random number and is incremented by 1 mod $2^{64}$ for subsequent trials, as follows:

$$MX=SHA1(K_x \| K_x)$$

$$MAC3A=MAC3B=[SHA1(MX+N_cT+R)]msb80$$

$$MAC4A=MAC4B=[SHA1(MX+N_cT+R)]lsb80$$

where "+" used in the above expressions means mod $2^{160}$ addition

In the content key confirmation procedure shown in FIG. 15, the sink device sends, to the source device, nonce $N_cT$ for test in the CONT_KEY_CONF command.

When the source device receives the CONT_KEY_CONF command, the source device extracts and compares nonce $N_cT$ with the current nonce $N_c$. If the current nonce $N_c$ is in the range of $N_cT$ to $N_cT+5$, the source device confirms that nonce $N_cT$ for test is valid. If the source device confirms that nonce $N_cT$ is valid, it performs content key confirmation based on whether MAC3A and MAC3B are equal to each other. After that, the sink device sends back, to the sink device, one of an ACCEPTED response indicating that the content key is correct and a REJECTED response indicating that the content key is incorrect.

When the sink device receives the ACCEPTED response from the source device, the source device performs content key confirmation based on whether MAC4A and MAC4B are equal to each other. When the sink device confirms by itself that the content key is correct, the sink device enters a confirmed state.

In addition, when the sink device fails in content key confirmation by itself although it receives the ACCEPTED response from the source device, and, when the sink device receives the REJECTED response from the source device, the sink device enters a non-confirmation state.

In this process, the confirmed state is a state in which, with the CONT_KEY_CONF command, it is confirmed that the content key is correct, while the non-confirmation state is a state in which, with the CONT_KEY_CONF command, it is confirmed that the content key is incorrect. Both states are described in DTCP Volume 1 Supplement E Section V1SE.8.6.

In the confirmed state, the sink device can continuously perform received content decryption. Alternatively, in the non-confirmation state, the sink device is unable to continuously perform the received content decryption.

Figure 16:
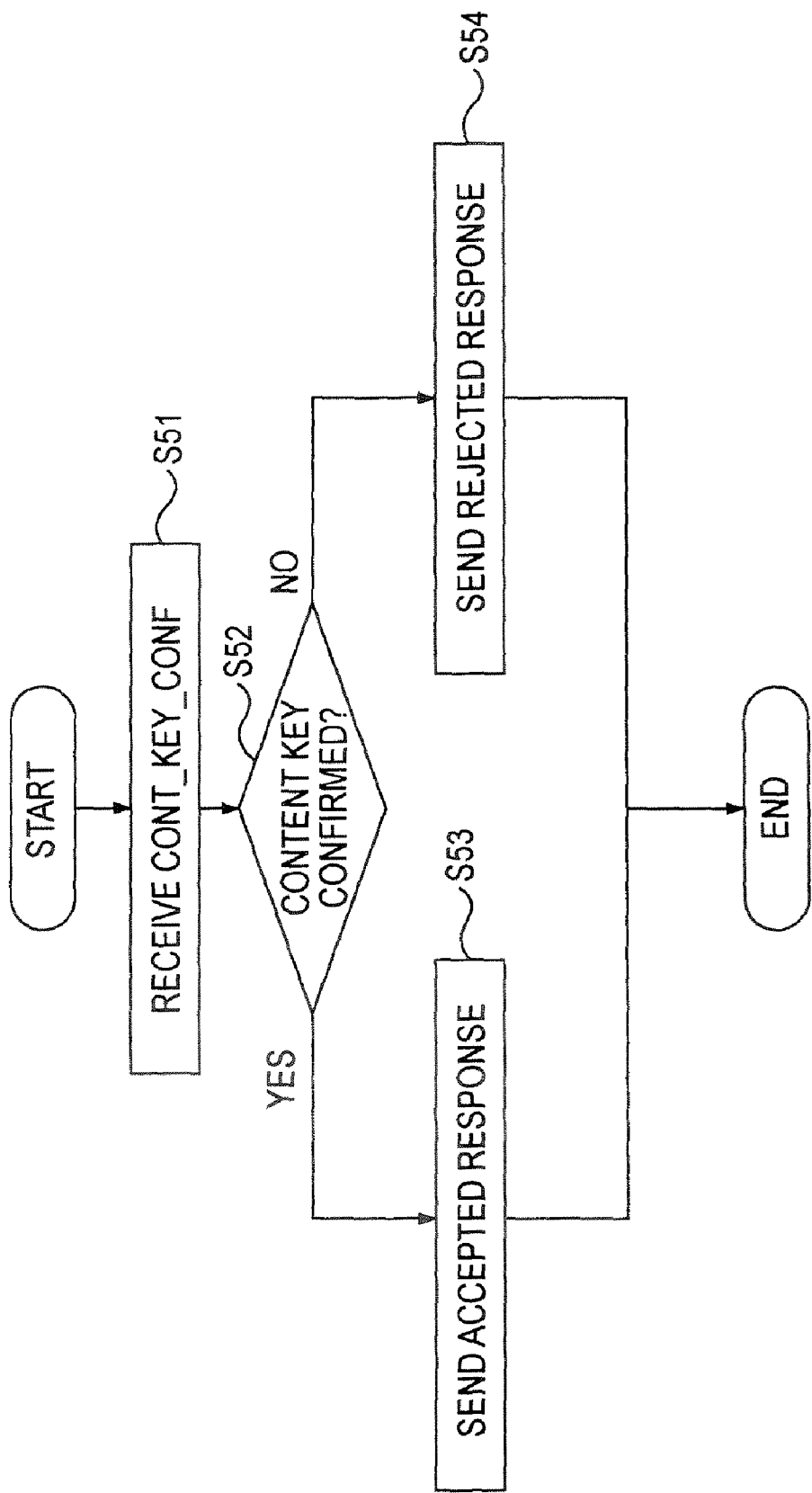
FIG. 16 is a flowchart showing a process in which a PCP-CCI-compliant source device performs a content key confirmation procedure between the source device and a legacy sink device.

FIG. 16 is a flowchart showing a process in which a PCP-CCI-compliant source device performs a content key confirmation procedure between the source device and a legacy sink device.

When, in step S51, the source device receives the CONT_KEY_CONF command, which requests content confirmation, from the sink device, to which the source device transmits content, the source device confirms a content key in step S52. Specifically, the source device extracts nonce $N_cT$ for test from the command and compares the extracted nonce with the current nonce $N_c$, that is, a value obtained by bit-concatenating 8-bit PCP-CCI and 56-bit pseudo nonce $N_c$'. If the current nonce $N_c$ is in the range of $N_cT$ to $N_cT+5$, the source device confirms that the nonce $N_cT$ for test is valid.

When the source device confirms that the content key is correct, in step S53, the source device sends back, to the sink device, the ACCEPTED response representing the confirmation. When the source device confirms that the content key is incorrect, in step S54, the source device sends back the REJECTED response representing the confirmation.

Both the ACCEPTED response and the REJECTED response are to-command responses described in DTCP Volume 1 Supplement E Section V1SE.8.6.

Figure 17:
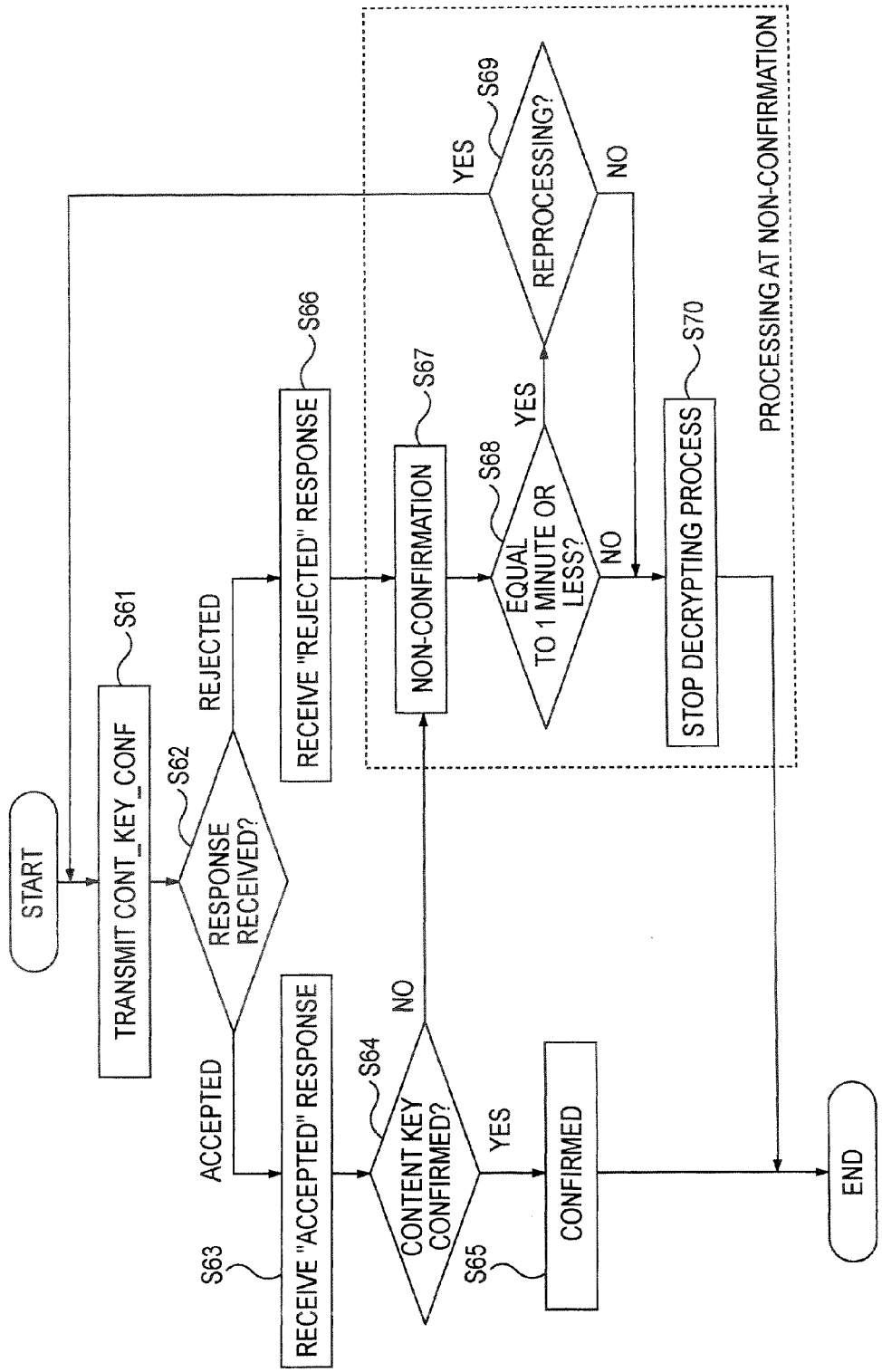
FIG. 17 is a flowchart showing a process in which a legacy sink device performs a content key confirmation procedure between the sink device and a PCP-CCI-compliant source device.

FIG. 17 is a flowchart showing a process in which a legacy sink device performs a content key confirmation procedure between the source device and a PCP-CCI-compliant source device.

After, in step S61, the sink device transmits the CONT_KEY_CONF command to the source device, which requests content, in step S62, the sink device awaits receiving a response from the source device.

When, in step S63, the sink device receives the ACCEPTED response from the source device, in step S64, the sink device confirms a content key. If the content key is correct in step S64, in step S65, the sink device enters a confirmed state. If the content key is incorrect in step S64, in step S67, the sink device enters a non-confirmation state. In addition, when, in step S66, the sink device receives a REJECTED response from the source device, in step S67, the sink device enters a non-confirmation state.

In this process, the confirmed state is a state in which, with the CONT_KEY_CONF command, it is confirmed that the content key is correct, while the non-confirmation state is a state in which, with the CONT_KEY_CONF command, it is confirmed that the content key is incorrect. Both states are described in DTCP Volume 1 Supplement E Section V1SE.8.6.

In the confirmed state, the sink device can continuously perform received content decryption. In this embodiment, the source device compares nonce $N_cT$ for test with the current nonce $N_c$ obtained by bit-concatenating 8-bit PCP-CCI and 56-bit pseudo nonce $N_c'$. Thus, even if a change in nonce is unnatural for the sink device, the sink device can continue reception of content and its decryption as far as the sink device is in the confirmed state. Alternatively, in the non-confirmation state, the sink device is unable to continue content decryption.

In addition, in step S68, within one minute after the sink device initially enters the non-confirmation state, the sink device can repeatedly performs the content key confirmation procedure while continuously performing combined processing. Thus, returning to step S41 in step S70, the sink device reissues the CONT_KEY_CONF command.

After the sink device repeatedly performs the content key confirmation procedure, if the sink device enters the confirmed state within one minute (step S65), the sink device can continue received content decryption. However, if the non-confirmation state of the sink device continues in one minimum (step S68), in step S69, the sink device needs to terminate the received content decryption.

Figure 18:
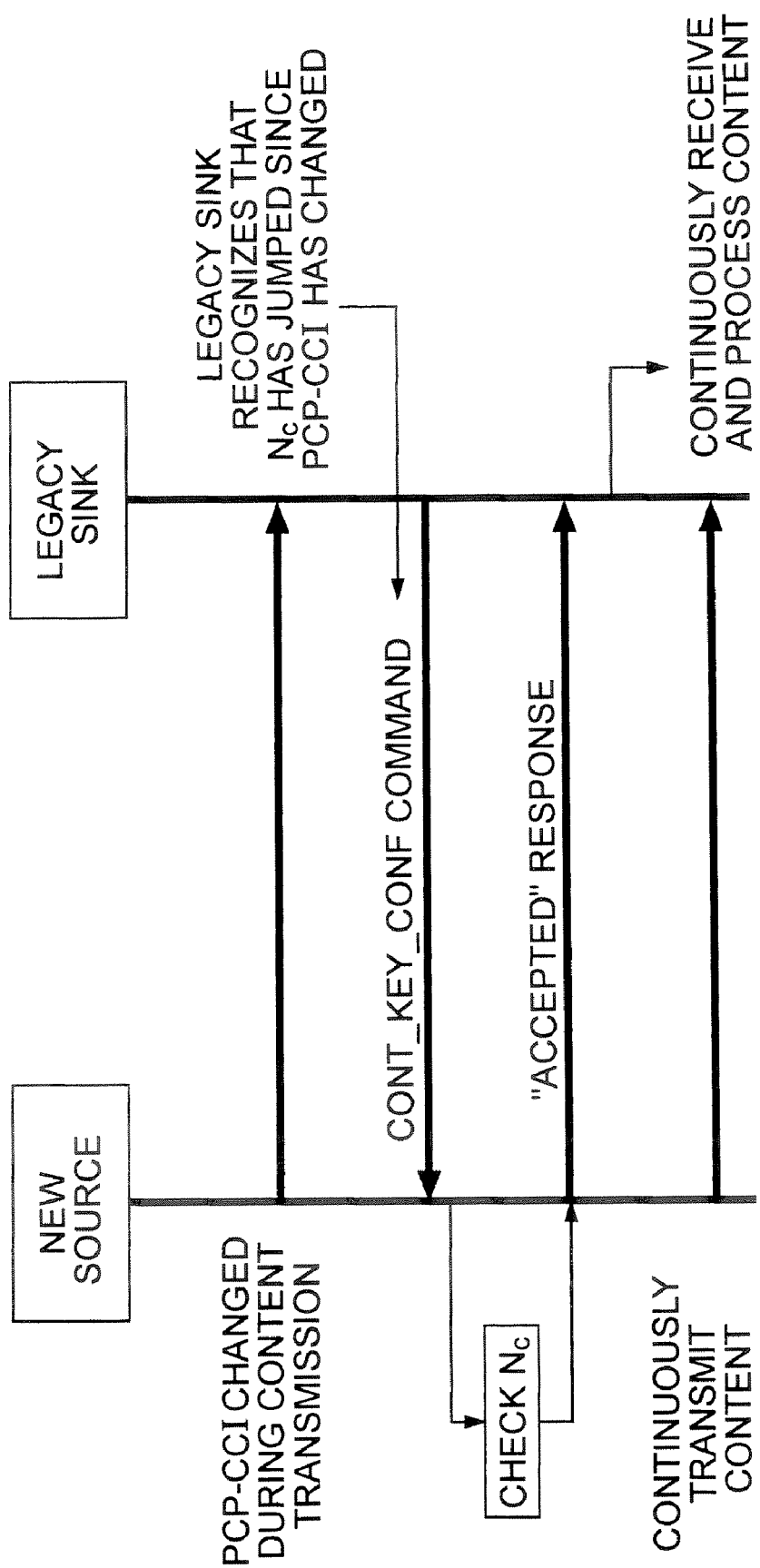
FIG. 18 is an illustration of an operation sequence of the content key confirmation procedure performed between a PCP-CCI-compliant source device (new source) and a sink device (legacy sink)

FIG. 18 shows an operation sequence of the content key confirmation procedure performed between a PCP-CCI-compliant source device (new source) and a sink device (legacy sink).

If the new source changes PCP-CCI during content transmission, the contiguousness of nonce $N_c$ written in the PCP header is accordingly lost. When the legacy sink recognizes such a jump of nonce $N_c$, the legacy sink establishes a TCP connection for content key confirmation, and issues the CONT_KEY_CONF command to the new source.

The new source extracts nonce $N_cT$ from the CONT_KEY_CONF command and compares the extracted nonce with nonce $N_c$ obtained by bit-concatenating updated PCP-CCI and the current pseudo nonce $N_c'$. When the new source confirms no alteration in nonce $N_c$, the new source sends an ACCEPTED response to the legacy sink and continuously performs content transmission. This allows the legacy sink to perform continuous reception of content and its decryption.

Regarding the second legacy problem, by including, a device certificate exchanged in a mutual authentication procedure (AKE), a CCI flag indicating that superextended copy control information is embedded in a PCP header, the sink device can recognize that the source device is not a legacy device. Alternatively, a capability confirming command that responds with such a CCI flag may be used.

A new PCP-CCI-compliant DTCP device uses a device certificate in which, for example, "1" is set as a CCI flag. As the CCI flag, a reserved field of the device certificate can be used. By checking the device certificate of the source device in the AKE procedure, the sink device can securely confirm whether the PCP-CCI field is included in the PCP header.

In this case, the PCP-CCI-compliant source device can send, at all times, a PCP packet in a new format in which a PCP-CCI field is embedded in the PCP header. When receiving a content stream from a new source device, the PCP-CCI-compliant sink device can use a PCP-CCI field included in the PCP header of the content stream.

Figure 19:
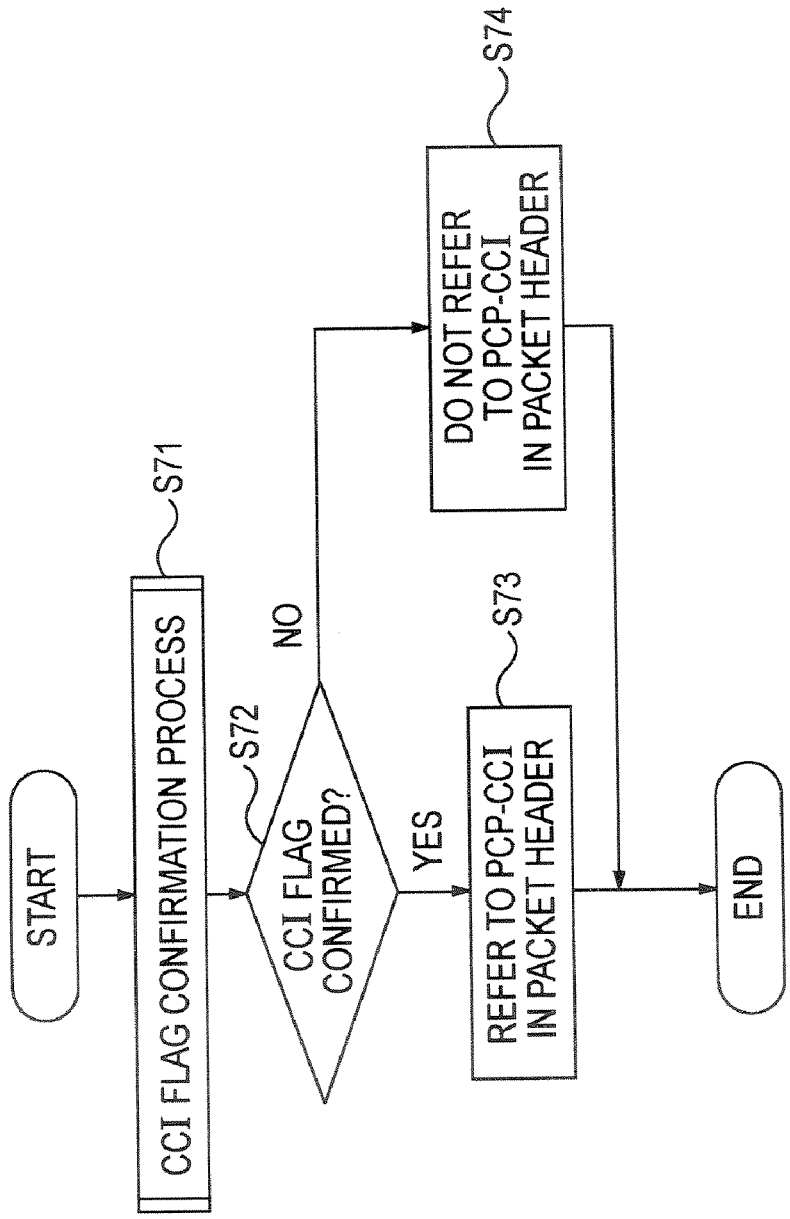
FIG. 19 is a flowchart showing a process in which a sink device processes copy control information in a PCP header by checking the CCI flag of a source device.

FIG. 19 is a flowchart showing a process in which a sink device processes copy control information in a PCP header by checking the CCI flag of a source device.

In step S71, in performing content key exchange and authentication procedure (AKE) before initiating a content transmission procedure between the sink device and the source device, the sink device executes a CCI flag confirmation process for confirming whether the source device sends a CCI flag indicating whether PCP-CCI is to be sent in a form embedded in the header. There are several possible methods for performing the CCI flag confirmation process, and their details are described later.

In step S72, the sink device checks whether to have confirmed the CCI flag. If the sink device has confirmed the CCI flag, in step S73, the sink device initiates a content transmission procedure, and, when receiving a content stream in PCP form, the sink device refers to upper 8 bits of a 64-bit nonce information field in the PCP header. If the sink device has not confirmed the CCI flag, in step S74, the sink device does not refer to the upper 8 bits of the nonce information field.

As a method for performing the confirmation process in step S71, that is, a specific method for confirming whether the source device has embedded PCP-CCI in the PCP header is inclusion of the CCI flag in a device certificate.

The device certificate shall bear a digital signature made by a reliable license authority such as the DTLA. Also, the certificate includes a public key of a transmitter of the certificate, whereby, in a Challenge-and-Response authentication procedure, by transmitting, to a receiver, a response (including Challenge data from the receiver) bearing a transmitter's signature, the transmitter can indicate, for the receiver, that the certificate of the transmitter is valid.

Figure 20:
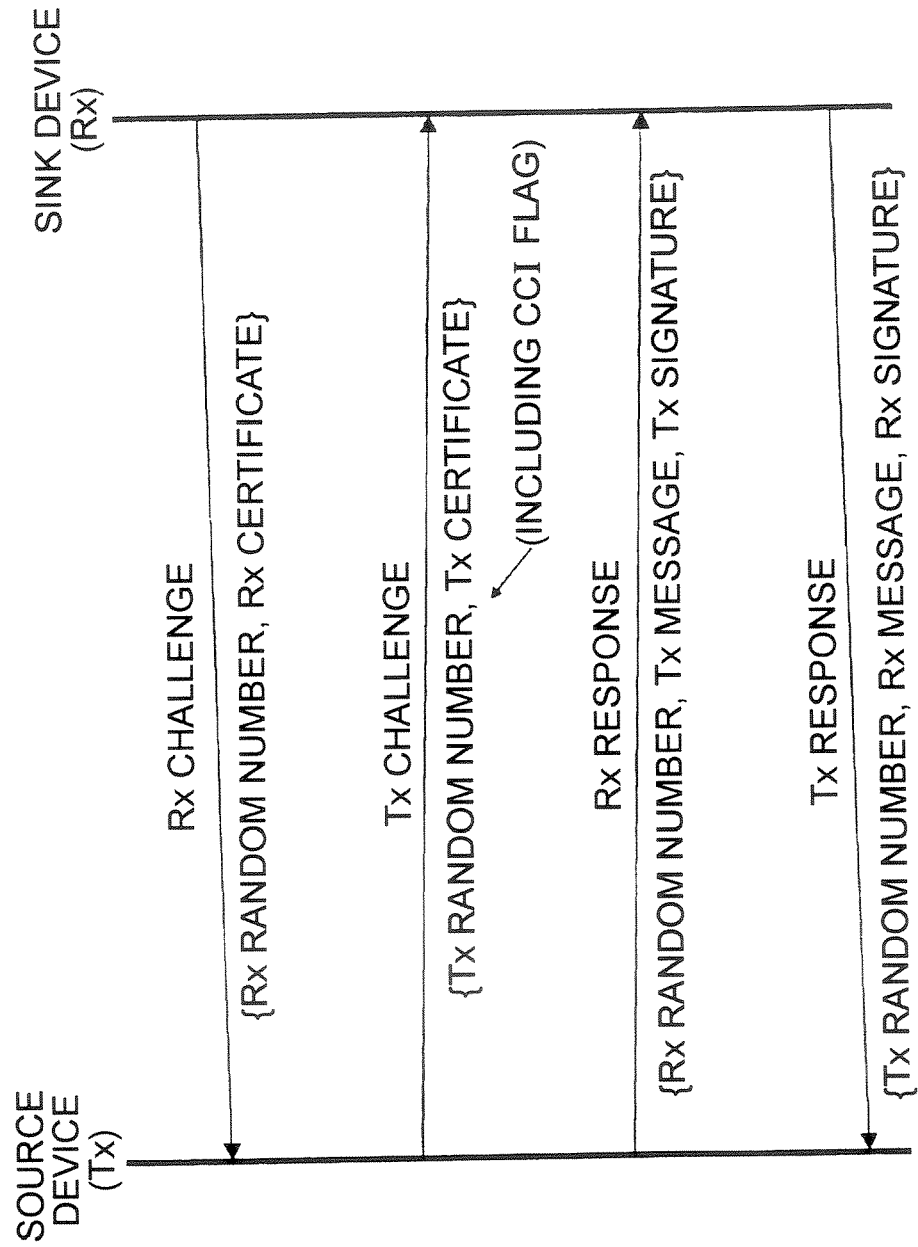
FIG. 20 is an illustration of an example of a transmitting/receiving sequence in which, by embedding a CCI flag in a device certificate, a source device indicates PCP-CCI compliance for a sink device.

FIG. 20 shows an example of a transmitting/receiving sequence in which, by embedding a CCI flag in a device certificate, a source device indicates PCP-CCI compliance for a sink device.

First, the sink device, which requests content, transmits an Rx challenge including an Rx random number and an Rx certificate. The source device responds with a Tx challenge including a Tx random number and a Tx certificate. In the Tx certificate, a CCI flag is set by using, for example, one bit of a reserved field. By checking the CCI flag, the sink device confirms that the source device is compliant to PCP-CCI.

Subsequently, the source device transmits an Rx response including the Rx random number, a Tx message, and a Tx signature, while the sink device transmits a Tx response including the Tx random number, an Rx message, and an Rx signature, and a normal Challenge-and-Response authentication procedure follows.

Figure 21:
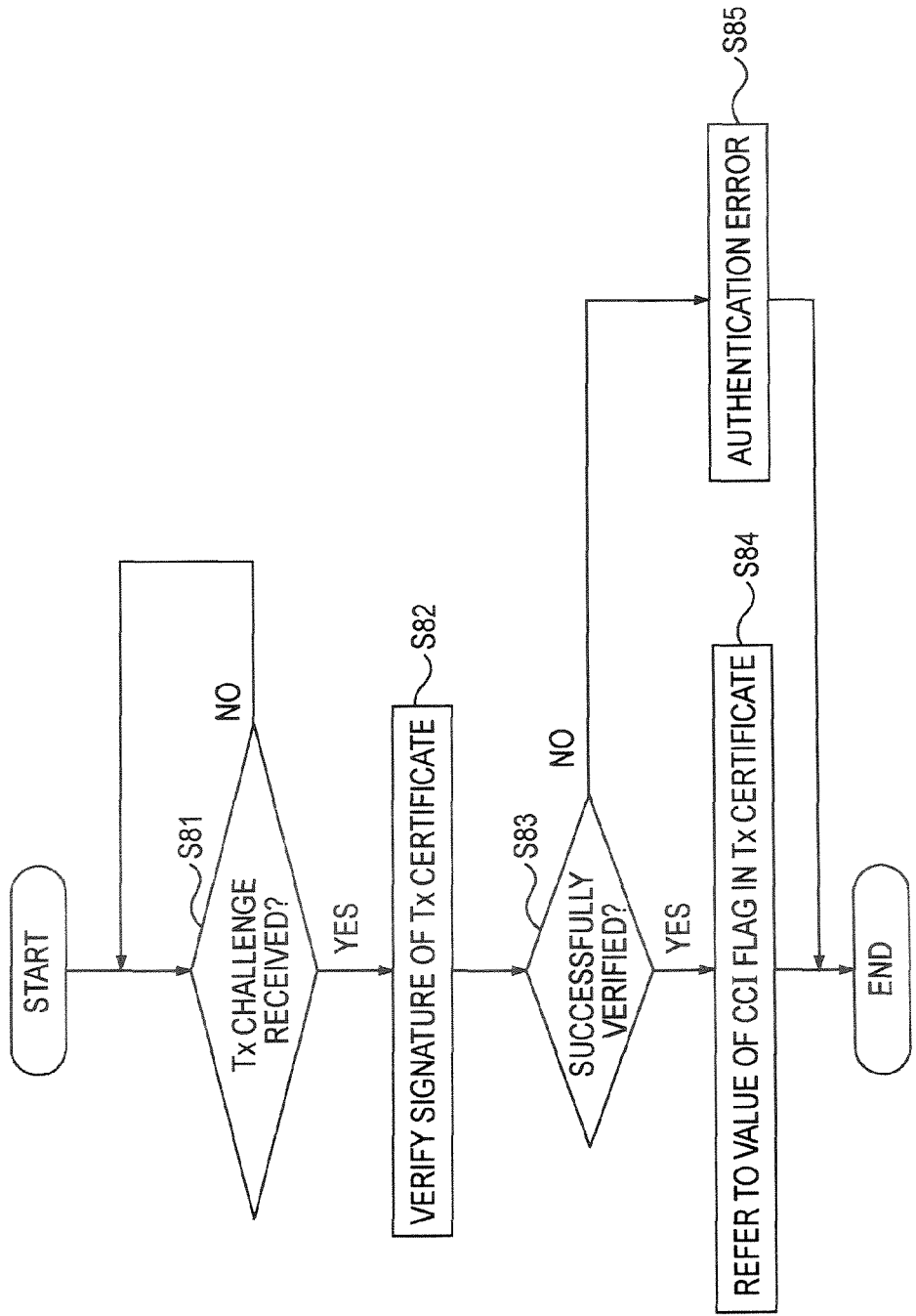
FIG. 21 is a flowchart showing a process for verifying the CCI flag from the device certificate included in the Tx challenge received by the sink device from the source device.

FIG. 21 is a flowchart showing a process for verifying the CCI flag from the device certificate included in the Tx challenge received by the sink device from the source device.

In step S81, the sink device receives the Tx challenge from the source device. In step S82, the sink device verifies the signature of the device certificate included in the Tx challenge. If, in step S83, the sink device succeeds in verification, in step S84, the sink device refers to the value of the CCI flag in the device certificate. If the sink device fails in verification, in step S85, the sink device sends back an authentication error without checking the value of the CCI flag.

In another method for confirming, in step S71, that the PCP-CCI is embedded in the PCP header by the source device, the source device embeds the CCI flag in the response the source device transmits in a form bearing the signature of the source device.

Figure 22:
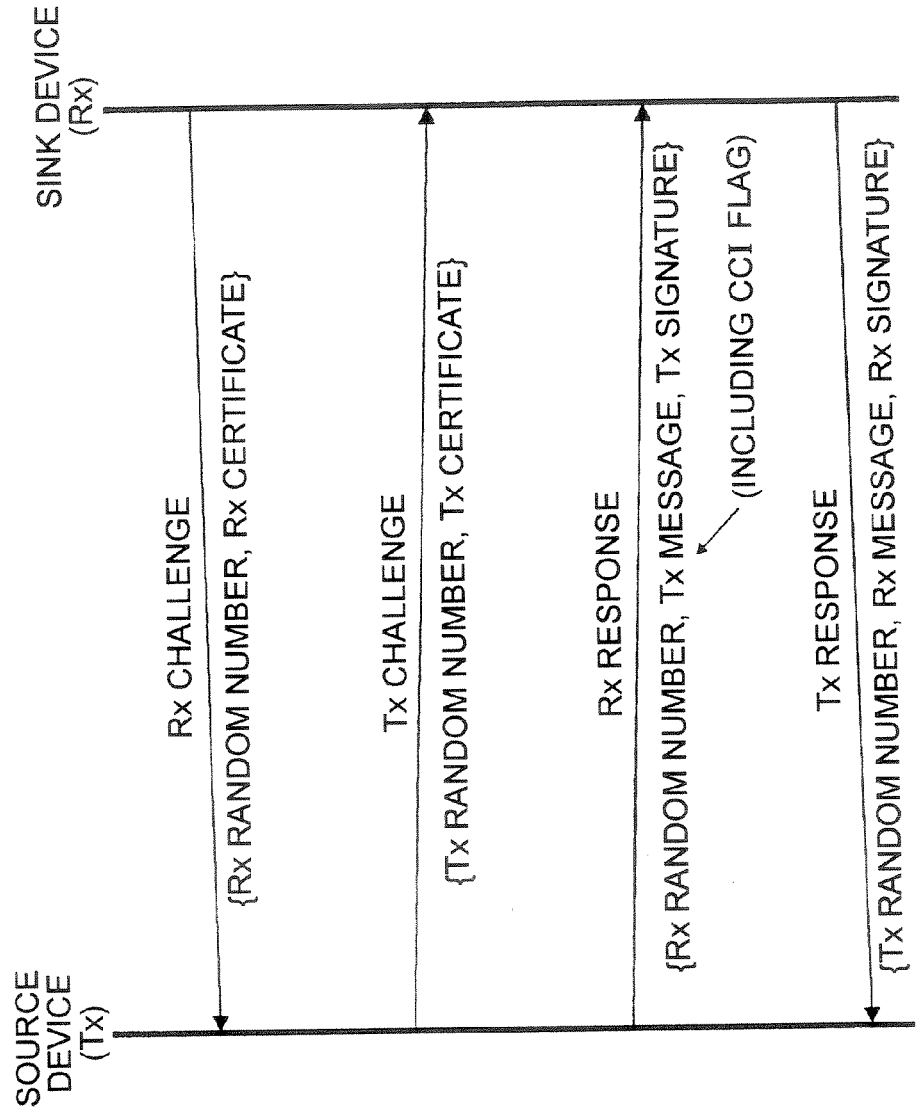
FIG. 22 is an illustration of an example of a transmitting/receiving sequence in which the source device indicates PCP-CCI-compliance for the sink device by embedding the CCI flag in the response the source device transmits in a form bearing the signature of the source device.

FIG. 22 shows an example of a transmitting/receiving sequence in which the source device indicates PCP-CCI-compliance for the sink device by embedding the CCI flag in the response the source device transmits in a form bearing the signature of the source device.

First, the sink device, which requests content, transmits an Rx challenge including an Rx random number and an Rx certificate. The source device responds with a Tx challenge including a Tx random number and a Tx certificate.

Next, the source device transmits an Rx response including the Rx random number, a Tx message, and a Tx signature. The Tx message includes a CCI flag. The sink device checks the CCI flag to confirm that the source device is compliant to PCP-CCI. The sink device transmits a Tx response including the Tx random number, an Rx message, and an Rx signature, and a normal Challenge-and-Response authentication procedure follows.

Figure 23:
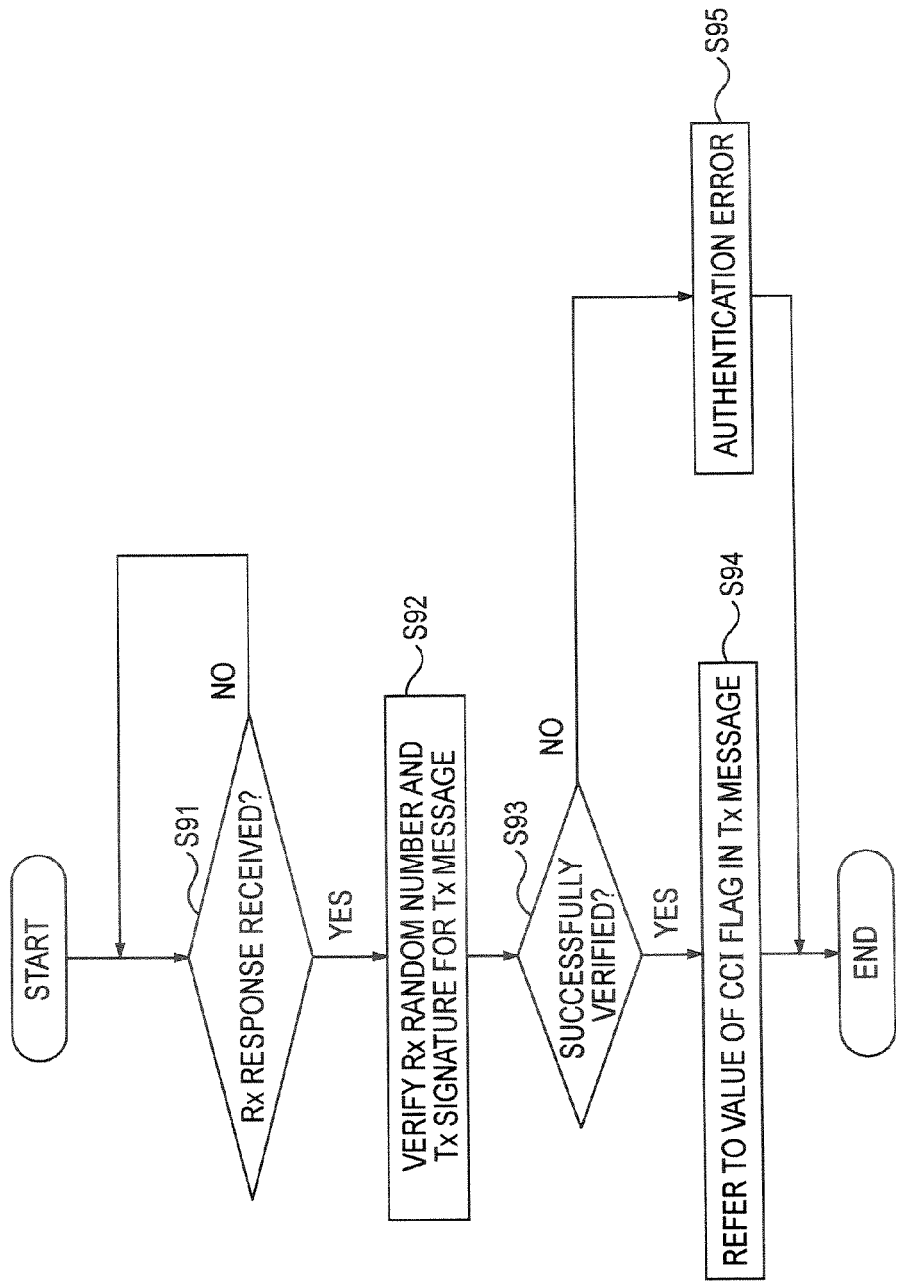
FIG. 23 is a flowchart showing a process for verifying the CCI flag from the Tx message included in the Rx response received by the sink device from the source device.

FIG. 23 is a flowchart showing a process for verifying the CCI flag from the Tx message included in the Rx response received by the sink device from the source device.

If, in step S91, the sink device receives the Rx response from the source device, in step S92, the sink device verifies the Rx random number and the Tx signature for the Tx message. If, in step S93, the sink device succeeds in verification, in step S94, the sink device refers to the value of the CCI flag in the Tx message. If the sink device fails in verification, in step S95, the sink device responds with an authentication error without checking the value of the CCI flag.

By using, for example, one bit of the reserved field in the Tx message, the CCI flag can be embedded. However, if the Rx response no longer has a location in which the CCI flag is inserted, a command for a new Rx response may be defined.

In addition, there is a problem in that it is difficult for the legacy sink device to respond to the command for the new Rx response. Accordingly, a command for a new Rx challenge in order for the sink device to request a new Rx response from the source device may be defined.

Figure 24:
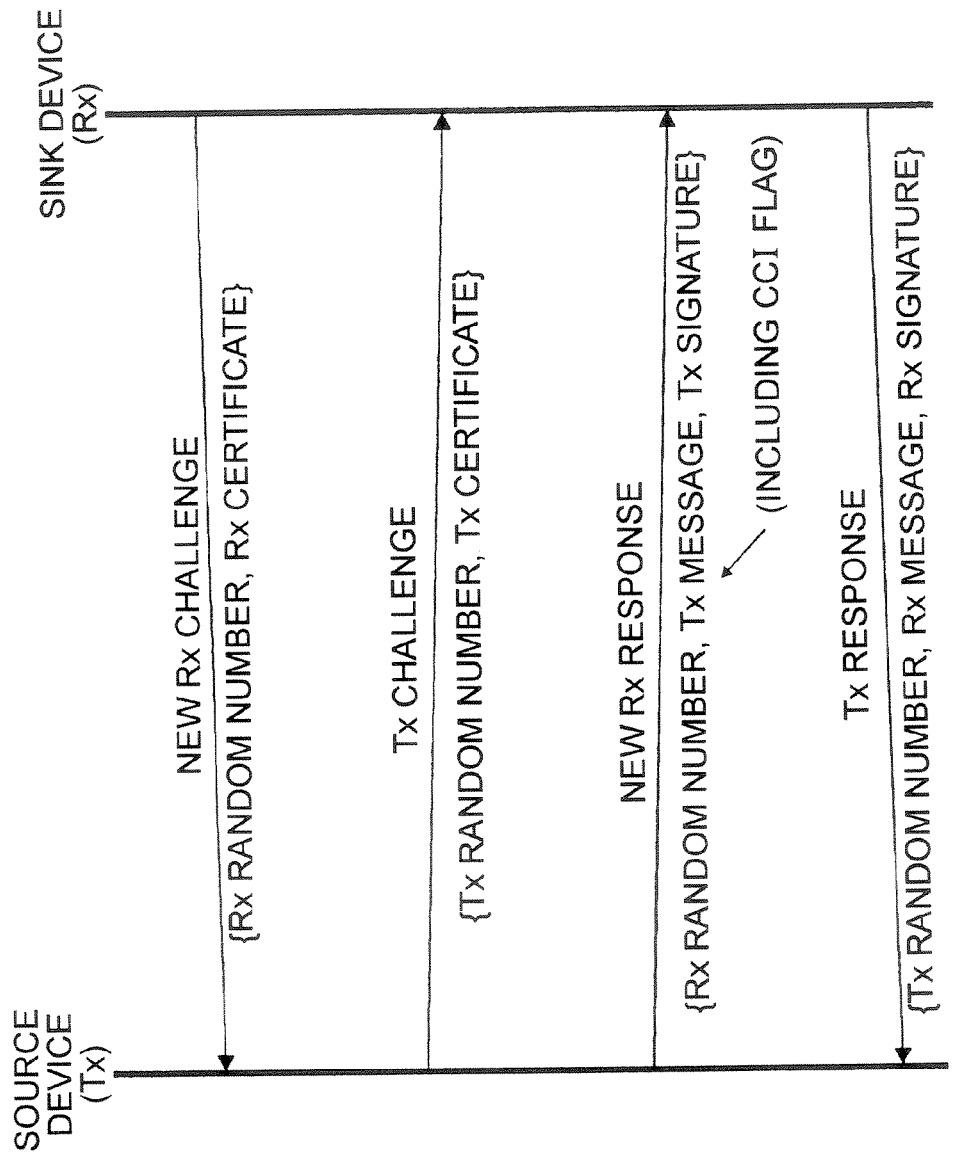
FIG. 24 is an illustration of an example of a transmitting/receiving sequence in which the sink device transmits a new Rx challenge to the source device, and the source device indicates its PCP-CCI compliance for the sink device by responding with a new Rx response in which the CCI flag is embedded.

FIG. 24 shows an example of a transmitting/receiving sequence in which the sink device transmits a new Rx challenge to the source device, and the source device indicates its PCP-CCI compliance for the sink device by responding with a new Rx response in which the CCI flag is embedded.

First, the sink device, which requests content, transmits, to the source device, a command for a new Rx challenge for requesting a new Rx response. This command for the Rx challenge includes an Rx random number and an Rx certificate, as described above. The source device responds with a Tx challenge including a Tx random number and a Tx certificate.

Next, the source device transmits a command for a new Rx response including the Rx random number, a Tx message, and a Tx signature. The Tx message includes a CCI flag. The sink device checks the CCI flag to confirm that the source device is compliant to PCP-CCI. After that, the seed key transmits a Tx response including the Tx random number, an Rx message, and an Rx signature, and a normal Challenge-and-Response authentication procedure follows.

Figure 25:
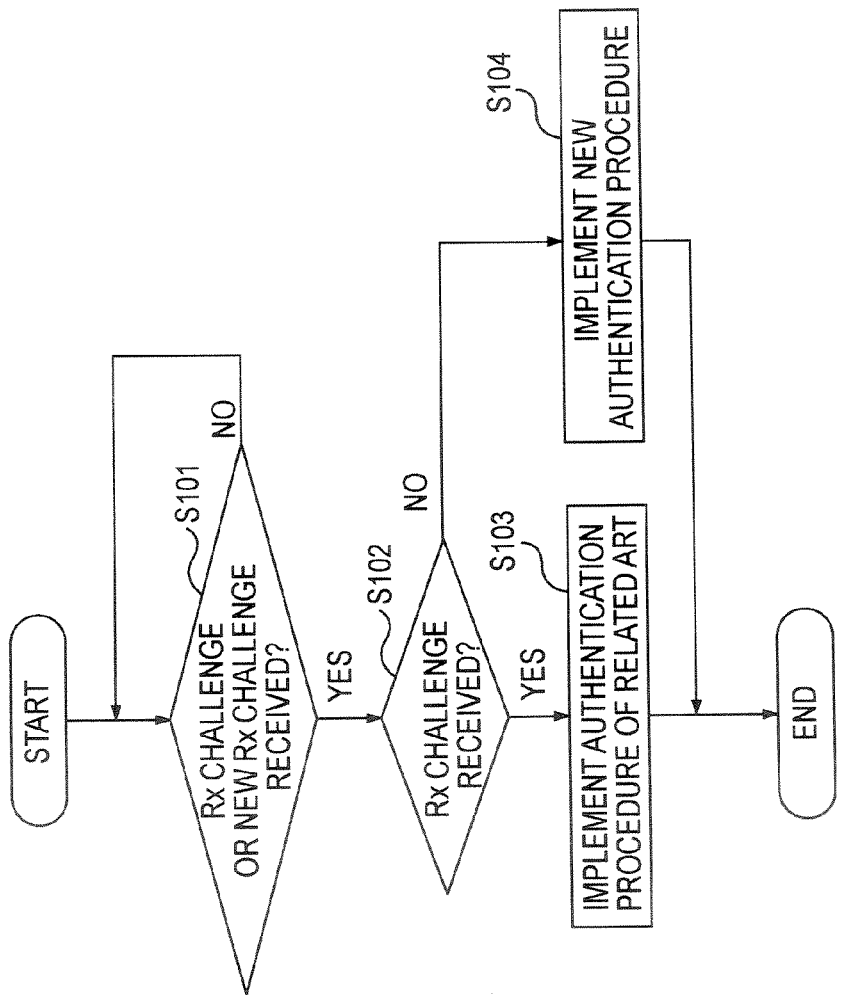
FIG. 25 is a flowchart showing a process for the source device to perform a Challenge-and-Response operation corresponding to the operation shown in FIG. 24.

FIG. 25 is a flowchart showing a process for the source device to perform a Challenge-and-Response operation corresponding to the operation shown in FIG. 24.

If, in step S101, the source device receives the Rx challenge from the sink device, in step S102, the sink device determines which of an Rx challenge of the related art and a new Rx challenge for requesting a new Rx response the received Rx challenge is.

If the source device receives the Rx challenge of the related art, in step S103, the source device subsequently performs an authentication process of the related art. If the source device receives the new Rx challenge, in step S104, the source device performs the authentication process shown in FIG. 24, whereby the source device indicates its PCP-CCI compliance for the sink device.

Figure 26:
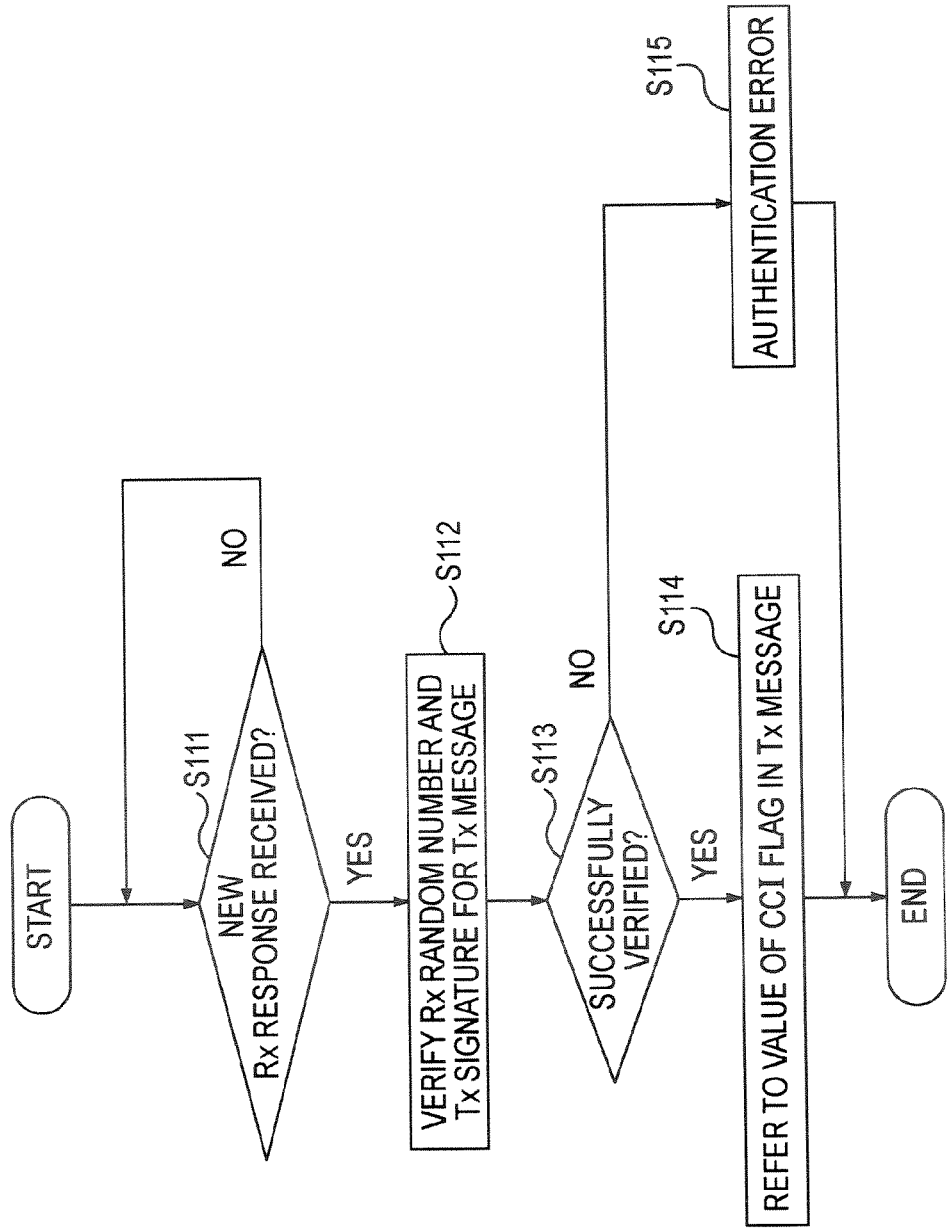
FIG. 26 is a flowchart showing a process in which the sink device verifies the CCI flag from the Tx message included in the new Rx response received from the source device.

FIG. 26 is a flowchart showing a process in which the sink device verifies the CCI flag from the Tx message included in the new Rx response received from the source device.

If, in step S111, the sink device receives the new Rx response from the source device, in step S112, the sink device verifies the Rx random number and the Tx signature for the Tx message. If, in step S113, the sink device succeeds in verification, in step S114, the sink device refers to the value of the CCI flag in the Tx message. If the sink device fails in verification, in step S115, the sink device responds with an authentication error.

In addition, in another method in which the sink device requests the new Rx response from the source device, a capability confirming command is newly defined.

Figure 27:
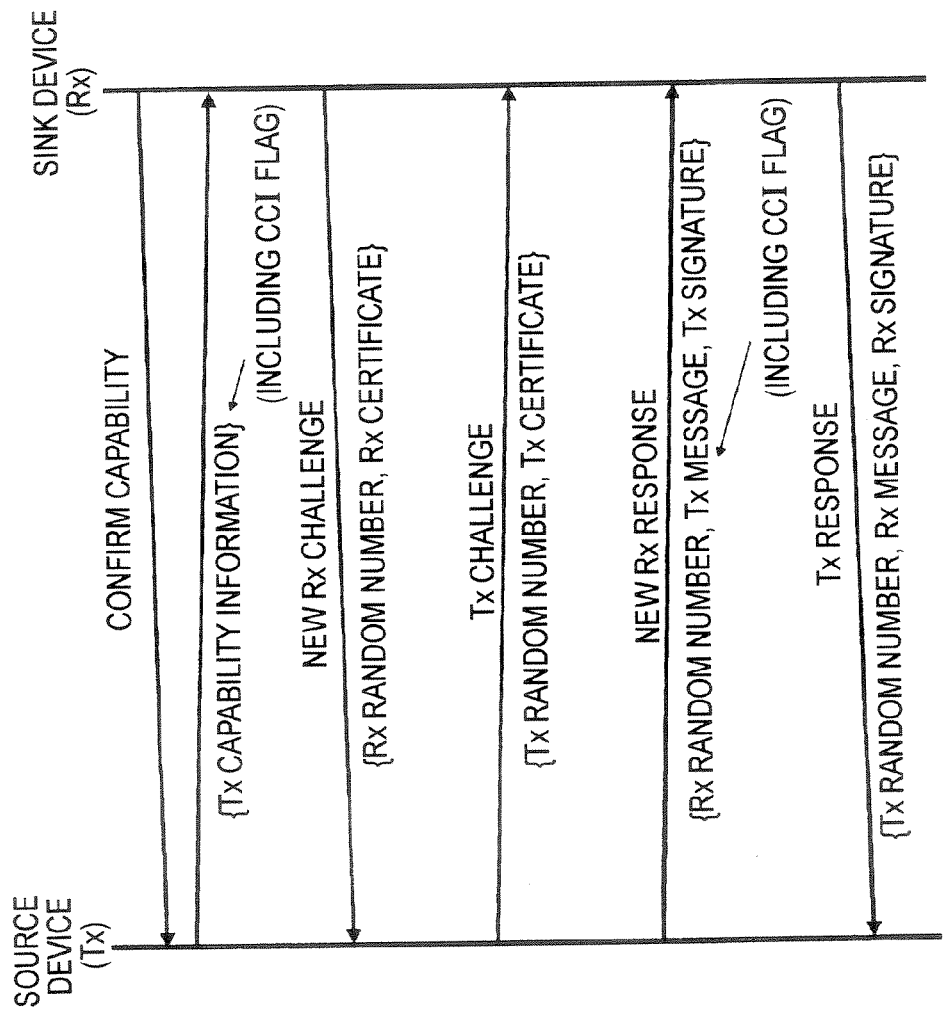
FIG. 27 is an illustration of an example of a transmitting/receiving sequence in which the sink device transmits a capability confirming command to the source device, and the source device indicates its PCP-CCI compliance for the sink device by responding with a capability confirmation response in which the CCI flag is embedded.

FIG. 27 shows an example of a transmitting/receiving sequence in which the sink device transmits a capability confirming command to the source device, and the source device indicates its PCP-CCI compliance for the sink device by responding with a capability confirmation response in which the CCI flag is embedded.

First, the sink device, which requests content, transmits a capability confirming command to the source device. The source device responds with a capability confirmation response. This response has a CCI flag set therein.

Next, the sink device, which requests content, transmits a command for a new Rx challenge for requesting a new Rx response from the source device. As described above, this command for the Rx challenge includes an Rx random number and an Rx certificate. The source device responds with a Tx challenge including the Tx random number and a Tx certificate.

Next, the source device transmits a command for a new Rx response including an Rx random number, a Tx message, and a Tx signature. The Tx message has a CCI flag set therein. The sink device checks the CCI flag to confirm that the source device is compliant to PCP-CCI. The sink device transmits a Tx response including the Tx random number, an Rx message, and an Rx signature, and a normal Challenge-and-Response authentication procedure follows.

Figure 28:
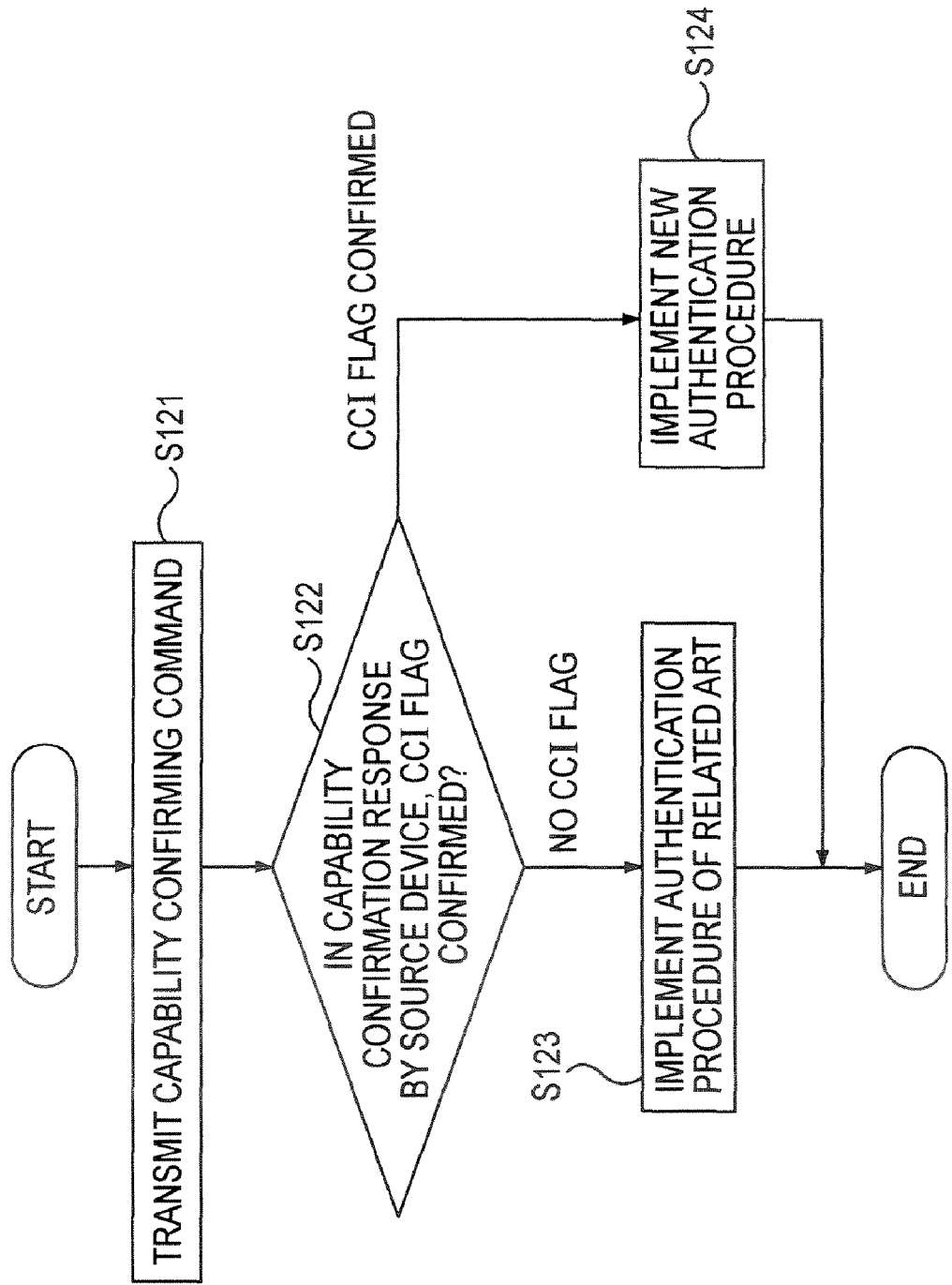
FIG. 28 is a flowchart showing a process in which the sink device performs a Challenge-and-Response operation corresponding to the operation shown in FIG. 27.

FIG. 28 is a flowchart showing a process in which the sink device performs a Challenge-and-Response operation corresponding to the operation shown in FIG. 27.

In step S121, first, the sink device transmits a capability confirming command when requesting, from the source device, the new Rx response in which the CCI flag is embedded.

After the source device responds with the capability confirmation response, in step S122, the sink device checks whether the CCI flag is set in the response.

If the CCI flag is not set, in step S123, the sink device subsequently performs the authentication process of the related art. If the CCI flag is set, in step S124, the sink device indicates its PCP-CCI compliance by performing the authentication process shown in FIG. 27. The new authentication procedure is not described since it is in accordance with the process shown in FIG. 26.

When the source device is not compliant to the capability confirming command transmitted from the sink device, the source device responds with a "not implemented" command. This allows the sink device to identify the source device as legacy one.

In a modification of the case of requesting the new Rx response by newly defining the capability confirming command, the Challenge-and-Response processing can be built into an initial capability confirming command and a response thereto, and the CCI flag can be securely sent during the operation sequence of the processing. In this case, the sink device transmits a capability confirming command to the source device, and the source device responds with a capability confirming response bearing a signature in which the CCI flag is embedded, whereby the source device indicates its PCP-CCI compliance for the sink device. The subsequent authentication process is as in the related art.

Figure 29:
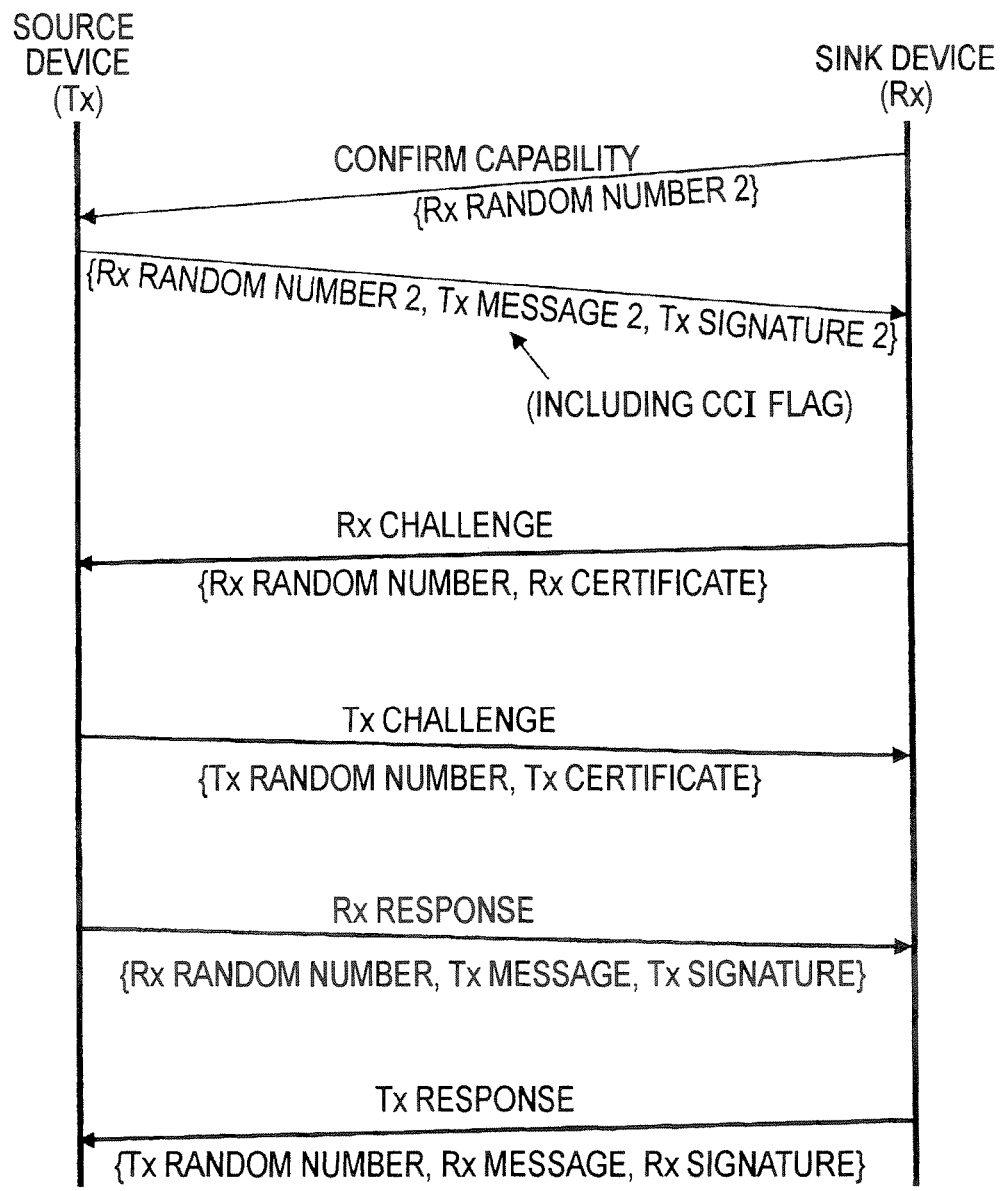
FIG. 29 is an illustration of an example of a transmitting/receiving sequence in which the sink device transmits a capability confirming command to the sink device, and, by responding with a capability confirmation response including a signature in which the CCI flag is embedded, the source device indicates its PCP-CCI compliance for the sink device.

FIG. 29 shows an example of a transmitting/receiving sequence in which, when the Challenge-and-Response processing is built into an initial capability confirming command and a response thereto, the source device indicates its PCP-CCI compliance for the sink device.

First, the sink device, which requests content, transmits a capability confirming command to the source device. This capability confirming command includes Rx random number 2 for the Challenge-and-Response. The source device responds with a capability confirmation response. The capability confirmation response includes Rx random number 2, Tx message 2, and Tx signature 2. Tx message 2 has a CCI flag set therein. The sink device checks the CCI flag to confirm that the source device is compliant to PCP-CCI.

Next, the sink device transmits an Rx challenge including an Rx random number and an Rx certificate. The source device responds with a Tx response including a Tx random number and a Tx certificate.

Next, the source device transmits an Rx response including the Rx random number, a Tx message, and a Tx signature. The sink device transmits a Tx response including the Tx random number, an Rx message, and an Rx signature, and a normal Challenge-and-Response authentication procedure follows.

Figure 30:
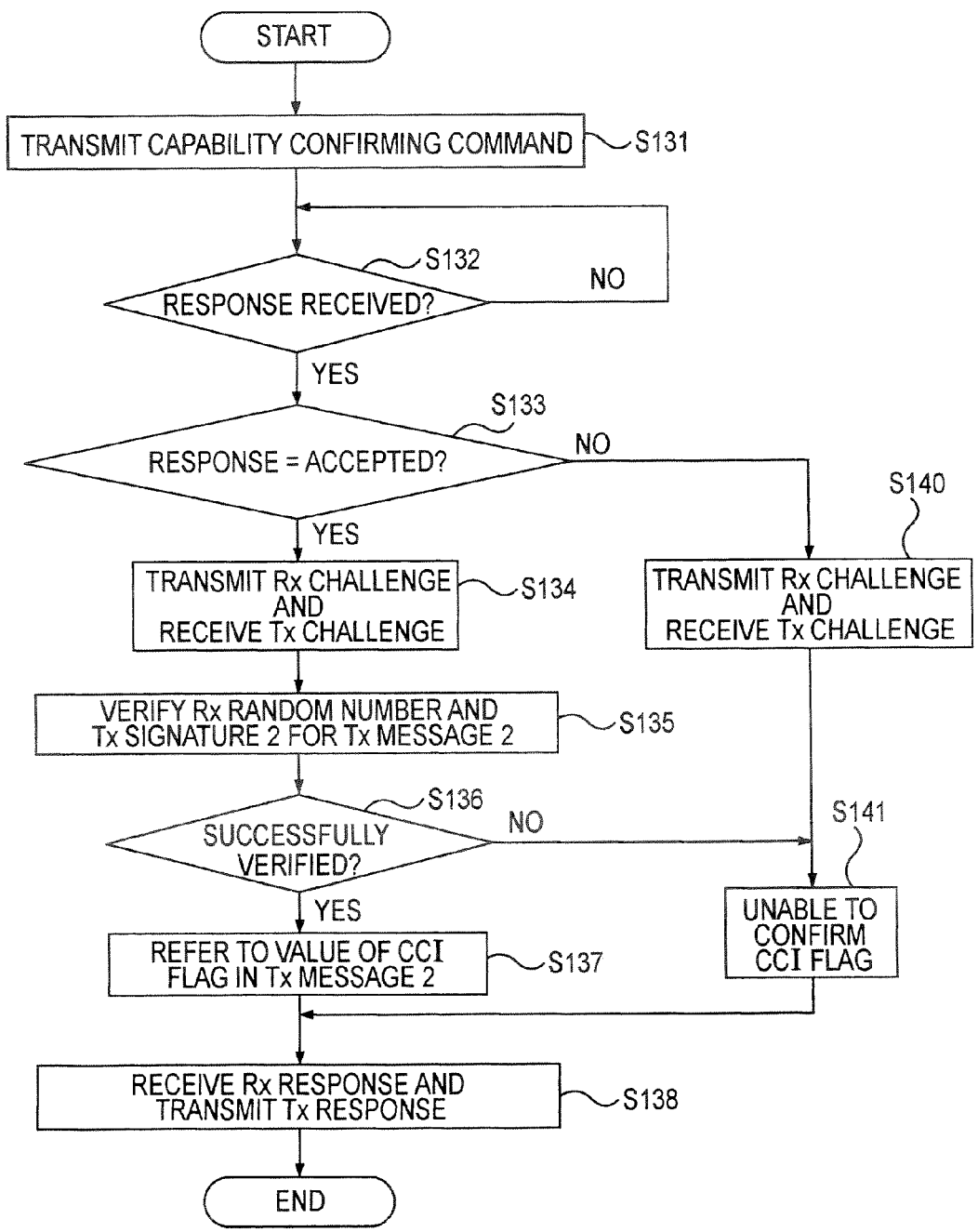
FIG. 30 is a flowchart showing a process in which the sink device performs a Challenge-and-Response operation corresponding to the operation shown in FIG. 29.

FIG. 30 is a flowchart showing a process in which the sink device performs a Challenge-and-Response operation corresponding to the operation shown in FIG. 29. Here, to verify Tx signature 2, a source device's public key included in the Tx certificate is necessary. Thus, this verification is performed after receiving the Tx challenge.

In step S131, the sink device transmits the capability confirming command including Rx random number 2 for the Challenge-and-Response.

If, in step S132, the sink device receives a response from the source device, and this response represents an ACCEPTED state (Yes in step S133), in step S134, the sink device transmits the Rx challenge and receives the Tx challenge. In step S135, the sink device verifies Tx signature 2 for Rx random number 2 and the Tx message.

If the sink device succeeds in verifying Tx signature 2 (Yes in step S136), in step S137, the sink device refers to the CCI flag included in Tx message 2 and confirms whether the CCI flag is set. If the sink device has confirmed that the CCI flag is set, the sink device allows the PCP-CCI to be referred to. Next, in step S138, the sink device transmits the Rx challenge including the Rx random number and the Rx certificate and receives the Tx challenge including the Tx random number and the Tx certificate from the source device.

If, in step S133, the sink device does not receive the ACCEPTED response to the capability confirming command, in step S140, the sink device transmits the Rx challenge including the Rx random number and the Rx certificate and receives the Tx challenge including the Tx random number and the Tx certificate from the source device. However, since, in step S141, the sink device does not confirm the CCI flag, the PCP-CCI is set not so as to be referred to.

If, in step S137, the sink device fails in verifying Tx signature 2, the sink device does not confirm the CCI flag in step S141. Thus, the PCP-CCI is set not so as to be referred to.

It should be understood by those skilled in the art that various modifications, combinations, sub-combinations and alterations may occur depending on design requirements and other factors insofar as they are within the scope of the appended claims or the equivalents thereof.

What is claimed is:

1. A content transmission device for transmitting content, whose copying is controlled, the content transmission device comprising:
   a processor configured to:
      perform an authentication procedure between the content transmission device and a content receiving device;
      generate first copy control information comprising at least four bits and indicating at least whether copying of the content is permitted;
      generate second copy control information comprising at least eight bits and including regions for identifying at least a multimedia type of the content, analog copy protection information for the content, and a picture size of the content in an output mode;
      generate a random number or pseudo-random number (nonce) used to create a content key to encrypt the content prior to transmitting the content from the content transmission device to the content receiving device;
      generate and transmit a packet to the content receiving device, the packet including a header including the first copy control information, the second copy control information, the generated nonce and a payload obtained by encrypting the content with the generated content key, wherein the header includes a field having a predetermined bit length of sixty four bits for transmitting the nonce, and the packet is transmitted in a form in which the second copy control information is embedded in the field for transmitting the nonce.

2. The content transmission device according to claim 1, wherein:
   the content transmission device operates under a transmission-system environment in which content transmission is performed using the packet having a format including the header including a field in which the first copy control information is written and a payload including content in which content-embedded copy control information is embedded; and
   the second copy control information includes mode information representing validity of the second copy control information included in the header.

3. The content transmission device according to claim 2, wherein:
   under the transmission-system environment, a cognizant function for implementing copy control of the content in response to recognizability of a format of the content is provided; and
   the processor is configured to realize the cognizant function depending on a combination of the mode information included in the second copy control information in the header and the content-embedded copy control information in the payload.

4. The content transmission device according to claim 1, wherein:
the processor is configured to generate a pseudo nonce which is shorter than the predetermined bit length by the at least eight bits of the second copy control information, and to encrypt the content using a content key generated based on a nonce formed by concatenating the bits of the second copy control information and the pseudo nonce.

5. The content transmission device according to claim 1, wherein:
the processor is configured to verify the nonce included in the header of the packet in response to a request from the content receiving device,
wherein, in response to a request from the content receiving device for verifying the nonce, the processor is configured to verify the verification-requested nonce by comparing the verification-requested nonce with the nonce in which the second copy control information is embedded.

6. The content transmission device according to claim 1, wherein, the processor describes information representing the transmission in an authentication command transmitted to the content receiving device.

7. The content transmission device according to claim 6, wherein the processor sets a predetermined flag in a device certificate included in a Challenge command in a Challenge-and-Response authentication procedure.

8. The content transmission device according to claim 6, wherein the processor sets a predetermined flag in a message included in a Response command in a Challenge-and-Response authentication procedure.

9. The content transmission device according to claim 6, wherein the processor describes the information in response to a predetermined request command from the content receiving device.

10. The content transmission device according to claim 1, wherein
the second copy control information includes a region identifying whether the second copy control information is a substitute for Embedded Copy Control Information (Embedded CCI).

11. The content transmission device according to claim 1, wherein
the second copy control information includes a region indicating that the second copy control information is not affected when the pseudo-random number (nonce) is incremented.

12. A content transmission method for transmitting content, whose copying is controlled, from a content transmission device, the method comprising:
performing an authentication procedure between the content transmitting device and the content receiving device;
generating, by the content transmitting device, first copy control information comprising at least four bits and indicating at least whether copying of the content is permitted;
generating, by the content transmitting device, second copy control information comprising at least eight bits and including regions for identifying at least a multimedia type of the content, analog copy protection information for the content, and a picture size of the content in an output mode;
generating, by the content transmitting device, a random number or pseudo-random number (nonce) used to create a content key to encrypt the content prior to transmitting the content from the content transmission device to the content receiving device;
generating and transmitting, by the content transmitting device, a packet to the content receiving device, the packet including a header including the first copy control information, the second copy control information, the generated nonce and a payload obtained by encrypting the content with the generated content key, wherein the header includes a field having a predetermined bit length of sixty four bits for transmitting the nonce, and the packet is transmitted in a form in which the second copy control information is embedded in the field for transmitting the nonce.

13. The content transmission method according to claim 12, wherein, under a transmission-system environment in which content transmission is performed by using the packet having a format including the header including a field in which the first copy control information is written and a payload including content in which content-embedded copy control information is embedded, the generated second copy control information includes mode information representing validity of the second copy control information included in the header.

14. The content transmission method according to claim 13, wherein:
under the transmission-system environment, a cognizant function for implementing copy control of the content in response to recognizability of a format of the content is provided; and
the cognizant function is realized depending on a combination of the mode information included in the second copy control information in the header and the content-embedded copy control information in the payload.

15. The content transmission method according to claim 12, further comprising:
generating a pseudo nonce which is shorter than the predetermined bit length by the at least eight bits of the second copy control information,
wherein, generating and transmitting includes encrypting the content using a content key generated based on a nonce formed by concatenating the bits of the second copy control information and the pseudo nonce.

16. The content transmission method according to claim 12, further comprising:
confirming the content key by verifying the nonce included in the header of the packet in response to a request from the content receiving device,
wherein, in response to a request from the content receiving device for verifying a nonce, the verification-requested nonce is verified by comparing the verification-requested nonce with the nonce in which the second copy control information is embedded.

17. The content transmission method according to claim 12, wherein, performing the authenticating procedure includes describing information representing the transmission in an authentication command transmitted to the content receiving device.

18. The content transmission method according to claim 17, wherein, performing the authentication procedure includes setting a predetermined flag in a device certificate included in a Challenge command in a Challenge- and Response authentication procedure.

19. The content transmission method according to claim 17, wherein, performing the authentication procedure includes setting a predetermined flag in a message included in a Response command in a Challenge-and-Response authentication procedure.

20. The content transmission method according to claim 17, wherein, performing the authentication procedure includes describing the information in response to a predetermined request command from the content receiving device.

21. A non-transitory computer readable medium including a computer program, which when executed by a content transmission device, causes the content transmission device to perform a method comprising:
  performing an authentication procedure between the content transmitting device and the content receiving device;
  generating first copy control information comprising at least four bits and indicating at least whether copying of the content is permitted;
  generating second copy control information comprising at least eight bits and including regions for identifying at least a multimedia type of the content, analog copy protection information for the content, and a picture size of the content in an output mode;
  generating a random number or pseudo-random number (nonce) used to create a content key to encrypt the content prior to transmitting the content from the content transmission device to the content receiving device; and
  generating and transmitting a packet to the content receiving device, the packet including a header including the first copy control information, the second copy control information, the generated nonce and a payload obtained by encrypting the content with the generated content key, wherein the header includes a field having a predetermined bit length of sixty four bits for transmitting the nonce, and the packet is transmitted in a form in which the second copy control information is embedded in the field for transmitting the nonce.

* * * * *